(12) United States Patent
Lakshminarayan et al.

(10) Patent No.: US 11,706,046 B2
(45) Date of Patent: *Jul. 18, 2023

(54) DYNAMIC SUPERFRAME SLOTTING

(71) Applicant: Ademco Inc., Golden Valley, MN (US)

(72) Inventors: Nagaraj Chickmagalur Lakshminarayan, Bangalore (IN); Arun Handanakere Sheshagiri, Bangalore (IN); Rajeev Ranjan, Bengaluru (IN); Sheetal R. Kadam, Bangalore (IN); Robert D. Juntunen, Golden Valley, MN (US)

(73) Assignee: Ademco Inc., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,378

(22) Filed: Apr. 1, 2022

(65) Prior Publication Data

US 2022/0224560 A1 Jul. 14, 2022

Related U.S. Application Data

(63) Continuation of application No. 16/785,047, filed on Feb. 7, 2020, now Pat. No. 11,329,842.

(51) Int. Cl.
*H04L 12/28* (2006.01)
*H04W 4/80* (2018.01)
(Continued)

(52) U.S. Cl.
CPC ....... *H04L 12/2832* (2013.01); *H04B 7/2656* (2013.01); *H04W 4/80* (2018.02); *H04W 72/0446* (2013.01); *H04L 2012/2841* (2013.01)

(58) Field of Classification Search
CPC ... H04W 72/0446; H04W 4/80; H04W 16/14; H04W 72/1252; H04L 12/2832; H04L 2012/2841; H04B 7/2656
See application file for complete search history.

(56) References Cited

U.S. PATENT DOCUMENTS 6,031,827 A 2/2000 Rikkinen et al.
6,690,657 B1 2/2004 Lau et al.
(Continued)

FOREIGN PATENT DOCUMENTS

CN 103596191 A 2/2014
EP 2757837 A1 7/2014
(Continued)

OTHER PUBLICATIONS

Mohamad Jaafer Ali, et al., "Efficient Access Arbitration Among Interfering WBANs Using Latin Rectangles", ARXIV.org, Cornell University Library, Jan. 27, 2017, XP080752029, 12 pgs.

(Continued)

*Primary Examiner* — Oussama Roudani
(74) *Attorney, Agent, or Firm* — Fredrikson & Byron, P.A.

(57) ABSTRACT

An apparatus includes processing circuitry configured to output, to a plurality of devices, an initial superframe configured in an initial superframe mode of a plurality of superframe modes. Each superframe mode of the plurality of superframe modes allocating each slot of a plurality of slots for wireless communication to a first protocol, a second protocol, or a third protocol. In response to determining a change in bandwidth, the processing circuitry is configured to select an updated superframe mode from the plurality of superframe modes. The processing circuitry is further configured to output, to the plurality of devices, an updated superframe configured in the updated superframe mode.

20 Claims, 15 Drawing Sheets

(51) Int. Cl.
    *H04B 7/26* (2006.01)
    *H04W 72/0446* (2023.01)

(56) References Cited

U.S. PATENT DOCUMENTS

| | | | |
|---|---|---|---|
| 7,593,422 B2 * | 9/2009 | Shvodian | H04W 74/04 370/336 |
| 8,228,859 B2 | 7/2012 | Wang et al. | |
| 8,467,357 B2 | 6/2013 | Wang et al. | |
| 8,884,774 B2 | 11/2014 | Sanderford, Jr. | |
| 9,285,988 B2 | 3/2016 | Kenney et al. | |
| 9,312,976 B2 | 4/2016 | Zhang | |
| 9,565,657 B2 | 2/2017 | Suresh et al. | |
| 9,736,703 B2 | 8/2017 | Goldsmith et al. | |
| 9,814,038 B2 | 11/2017 | Suresh et al. | |
| 9,872,146 B2 | 1/2018 | Mycek et al. | |
| 9,913,232 B2 | 3/2018 | Seo et al. | |
| 9,930,641 B2 | 3/2018 | Beema et al. | |
| 9,978,237 B2 | 5/2018 | Britt et al. | |
| 10,039,052 B2 | 7/2018 | Zhou et al. | |
| 10,051,494 B2 | 8/2018 | Rengarajan et al. | |
| 10,091,786 B2 | 10/2018 | Schmidl et al. | |
| 10,129,916 B1 | 11/2018 | Lakshminarayan | |
| 10,237,237 B2 | 3/2019 | Dawes et al. | |
| 10,499,405 B2 | 12/2019 | Lee et al. | |
| 10,798,539 B2 | 10/2020 | Marschalkowski et al. | |
| 10,833,754 B2 | 11/2020 | Desclos et al. | |
| 10,913,094 B2 | 2/2021 | Li et al. | |
| 10,916,106 B2 * | 2/2021 | Beema | H04J 3/065 |
| 11,184,322 B2 | 6/2021 | Dawes et al. | |
| 11,329,842 B2 | 5/2022 | Lakshminarayan et al. | |
| 11,425,199 B2 | 8/2022 | Eskildsen et al. | |
| 2003/0137993 A1 | 7/2003 | Odman | |
| 2005/0058149 A1 | 3/2005 | Howe | |
| 2006/0068820 A1 | 3/2006 | Sugaya et al. | |
| 2007/0090996 A1 | 4/2007 | Wang | |
| 2008/0032738 A1 | 2/2008 | Lemke et al. | |
| 2009/0103488 A1 | 4/2009 | Zhu et al. | |
| 2011/0038356 A1 | 2/2011 | Bachrach | |
| 2012/0166338 A1 | 6/2012 | Agnelli et al. | |
| 2013/0320080 A1 | 12/2013 | Olson et al. | |
| 2014/0324410 A1 | 10/2014 | Mathews et al. | |
| 2014/0375428 A1 | 12/2014 | Park | |
| 2015/0108901 A1 | 4/2015 | Greene et al. | |
| 2015/0356332 A1 | 12/2015 | Turner et al. | |
| 2016/0029346 A1 | 1/2016 | Suresh et al. | |
| 2016/0044661 A1 | 2/2016 | Suresh | |
| 2017/0055199 A1 | 2/2017 | Petersen et al. | |
| 2017/0223615 A1 | 8/2017 | Lee et al. | |
| 2017/0230810 A1 | 8/2017 | Banerjea | |
| 2017/0273013 A1 | 9/2017 | Edara et al. | |
| 2017/0332049 A1 | 11/2017 | Zhang | |
| 2018/0041959 A1 | 2/2018 | Yang et al. | |
| 2018/0098263 A1 | 4/2018 | Luo et al. | |
| 2018/0242100 A1 | 8/2018 | Gandhi et al. | |
| 2018/0242312 A1 | 8/2018 | Gandhi et al. | |
| 2018/0279208 A1 | 9/2018 | Eskildsen et al. | |
| 2018/0324607 A1 | 11/2018 | Rengarajan et al. | |
| 2019/0132836 A1 | 5/2019 | Li et al. | |
| 2019/0197838 A1 | 6/2019 | Beema et al. | |
| 2019/0199578 A1 | 6/2019 | Lakshminarayan et al. | |
| 2019/0250899 A1 | 8/2019 | Riedl et al. | |
| 2019/0281371 A1 | 9/2019 | Klicpera | |
| 2019/0281608 A1 | 9/2019 | Huang et al. | |
| 2019/0380018 A1 | 12/2019 | Tian | |
| 2020/0037252 A1 | 1/2020 | Chiarizio et al. | |
| 2020/0068578 A1 | 2/2020 | Lee et al. | |
| 2020/0267561 A1 | 8/2020 | Lakshminarayan et al. | |
| 2020/0296664 A1 | 9/2020 | Lakshminarayan et al. | |
| 2021/0201486 A1 | 7/2021 | Takenouchi | |

FOREIGN PATENT DOCUMENTS

| | | |
|---|---|---|
| EP | 3506719 A1 | 7/2019 |
| EP | 3951732 A1 | 2/2022 |
| WO | 9819400 A1 | 5/1998 |
| WO | 2016160215 A1 | 10/2016 |
| WO | 2017143320 A1 | 8/2017 |
| WO | 2020096969 A1 | 5/2020 |
| WO | 2020195379 A1 | 10/2020 |

OTHER PUBLICATIONS

IEEE 802.11, Wikipedia, The free Encyclopedia, last edit Dec. 30, 2019, accessed on Feb. 4, 2019, 15 pgs.

* cited by examiner

DYNAMIC SUPERFRAME SLOTTING

RELATED APPLICATION

This application is a continuation of, and claims priority to, U.S. patent application Ser. No. 16/785,047, filed on Feb. 7, 2020.

TECHNICAL FIELD

This disclosure relates to networks, particularly networks used in, for example, home monitoring systems, comfort systems, and security systems.

BACKGROUND

A home network may use a wireless network protocol to connect devices within the home. For example, a hub device may use IEEE 802.15.4 to connect to over one hundred sensor devices in a home to the hub device. The hub device may then collect sensor data collected by the sensor devices in the home. For instance, the hub device may collect temperature readings from multiple temperature sensors arranged within the house and output the temperature readings to a thermostat that controls an HVAC system using the temperature readings. In another instance, the hub device may collect door/window sensor readings and output the door/window sensor readings to a home security sensor.

SUMMARY

In general, this disclosure relates to systems, devices, and techniques for wirelessly connecting devices using multiple wireless protocols that use time-division duplexing, such as, for example, time-division multiple access (TDMA). As used herein, time-division duplexing may refer to processes that allocates each communication of multiple communications at a particular frequency (e.g., a 2.4 GHz band) into a time "slot" of a repeating "superframe." In contrast, frequency-division multiplexing may assign each communication of multiple communications to a unique frequency.

Processing circuitry may allocate each slot according to a superframe mode. For example, a hub device may use an initial superframe mode that allocates a particular slot for wireless communication to a first protocol (e.g., IEEE 802.15.4). For instance, the hub device may output an initial superframe in an initial superframe mode configured for a relatively low amount of bandwidth to BLUETOOTH communications and a relatively high amount of the bandwidth to IEEE 802.15.4. In this example, the hub device may use an updated superframe mode that allocates the particular slot for wireless communication to a second protocol (e.g., BLUETOOTH). For instance, the hub device may output an updated superframe in an updated superframe mode configured for a relatively high amount of bandwidth to BLUETOOTH communications and a relatively low amount of the bandwidth to IEEE 802.15.4. In this way, the hub device may dynamically assign slots of a superframe based on the data to be transmitted to and from the sensor device. Techniques described herein may improve a performance of a network. For example, a hub device that performs dynamic superframe slotting may more efficiently allocate slots to different protocols, which may effectively increase a bandwidth of the network and may increase a reliability of the network.

In one example, an apparatus for communication with a plurality of devices using TDMA includes processing circuitry configured to: output, to the plurality of devices, an initial superframe configured in an initial superframe mode of a plurality of superframe modes, each superframe mode of the plurality of superframe modes allocating each slot of a plurality of slots for wireless communication to a first protocol, a second protocol, or a third protocol, wherein the first protocol, the second protocol, and the third protocol are different from each other; in response to determining a change in bandwidth allocated to one or more of the first protocol, the second protocol, or the third protocol, select an updated superframe mode from the plurality of superframe modes that is different from the initial superframe mode; and output, to the plurality of devices, an updated superframe configured in the updated superframe mode.

In another example, a method includes: outputting, by processing circuitry, to a plurality of devices, an initial superframe configured in an initial superframe mode of a plurality of superframe modes, each superframe mode of the plurality of superframe modes allocating each slot of a plurality of slots for wireless communication to a first protocol, a second protocol, or a third protocol, the first protocol, the second protocol, and the third protocol being different from each other; in response to determining a change in bandwidth allocated to one or more of the first protocol, the second protocol, or the third protocol, selecting, by the processing circuitry, an updated superframe mode from the plurality of superframe modes that is different from the initial superframe mode; and outputting, by the processing circuitry, to the plurality of devices, an updated superframe configured in the updated superframe mode.

In one example, a system includes: a plurality of sensor devices; and a hub device in communication with the plurality of devices using TDMA, the hub device comprising processing circuitry configured to: output, to the plurality of devices, an initial superframe configured in an initial superframe mode of a plurality of superframe modes, each superframe mode of the plurality of superframe modes allocating each slot of a plurality of slots for wireless communication to a first protocol, a second protocol, or a third protocol, the first protocol, the second protocol, and the third protocol being different from each other; in response to determining a change in bandwidth allocated to one or more of the first protocol, the second protocol, or the third protocol, select an updated superframe mode from the plurality of superframe modes that is different from the initial superframe mode; and output, to the plurality of devices, an updated superframe configured in the updated superframe mode.

The details of one or more examples of the disclosure are set forth in the accompanying drawings and the description below. Other features, objects, and advantages will be apparent from the description, drawings, and claims.

DETAILED DESCRIPTION

Figure 1A:
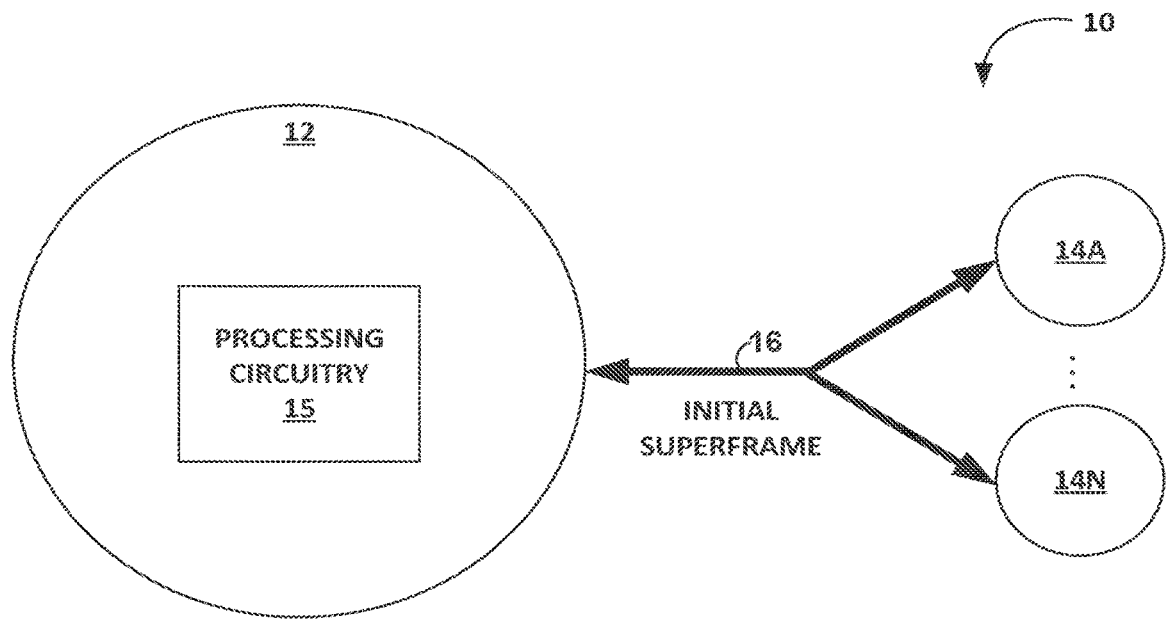
FIG. 1A is a conceptual diagram illustrating devices in communication using an initial superframe mode, in accordance with some examples of this disclosure.

Modern residential buildings or other buildings may include a central "hub" device configured to manage one or more systems within the building, such as monitoring systems, comfort systems, or other security systems. The hub device may be in wireless communication with a number of other devices placed throughout the building. For example, the central hub device may wirelessly receive sensor data from any number of different sensor devices, such as motion sensors, air quality and/or temperature sensors, infrared sensors, door and/or window contact sensors, and/or other sensor devices. Additionally, the hub device may wirelessly transmit commands or instructions to one or more controllable sensor devices. For example, the hub device may instruct a thermostat to adjust a temperature within the building, or in another example, may command a damper to open or close an air vent.

In some applications for managing one or more systems within a building, BLUETOOTH radio communication techniques may have an advantage over other radio connection techniques such as, for example, IEEE 802.15.4 radio communication techniques. For instance, BLUETOOTH radio communications techniques may support high data rates and throughput compared to IEEE 802.15.4 radio communication techniques. For example, BLUETOOTH may have a bandwidth of greater than 500 kilobits-per-second (kbps) (e.g., 1 Mbps) and IEEE 802.15.4 may have a bandwidth of less than 500 kbps (e.g., 250 kbps). From a range perspective, BLUETOOTH radio techniques and IEEE 802.15.4 radio communication techniques may have nearly equal link budget. BLUETOOTH may have a range of greater than 80 meters (e.g., 100 meters) and IEEE 802.15.4 may have a range of less than 80 meters (e.g., 70 meters). In some examples, BLUETOOTH may have a join time (e.g., latency) of greater than 1 second (e.g., 3 seconds) and IEEE 802.15.4 may have a join time of less than 1 second (e.g., 30 milliseconds (ms)). BLUETOOTH may have a stack size of greater than 100 kb (e.g., 250 kb) and IEEE 802.15.4 may have a stack size of less than 100 kb (e.g., 28 ms). In some examples, IEEE 802.11, also referred to herein as simply "Wi-Fi™," may offer even higher data rates than BLUETOOTH but with a higher energy cost.

As used herein, BLUETOOTH may refer to present and future versions of BLUETOOTH. Examples of BLUETOOTH include classic BLUETOOTH (e.g., Versions 1.0, 1.0B, 1.1, 1.2, 2.0, 2.1, 3.0, 4.0, 4.1, 4.2, 5, 5.1, etc.), BLUETOOTH-low energy (e.g., Versions 4.0, 4.1, 4.2, 5, 5.1, etc.), and other types of BLUETOOTH. As such, all instances of "BLUETOOTH" herein should be interpreted as including classic BLUETOOTH and/or BLUETOOTH-low energy. BLUETOOTH may operate at frequencies between 2.402 and 2.480 GHz, 2.400 and 2.4835 GHz including a 2 MHz wide guard band and a 3.5 MHz wide guard band, or another frequency range. In some examples, each frequency channel of the BLUETOOTH channel may have a center frequency different from a central frequency of a neighboring channel by less than 1 MHz. In some examples, each frequency channel of a wireless channel (e.g., an IEEE 802.15.4 channel) may have a center frequency different from a central frequency of a neighboring channel by greater than 1 MHz (e.g., 2 MHz, 5 MHz, etc.).

BLUETOOTH may refer to communications that use frequency hopping, such as, for example, frequency-hopping spread spectrum, to avoid interference from other radio communications. For example, a device using a BLUETOOTH channel may operate a BLUETOOTH channel that hops between 37 frequency channels when using advertising channels and 40 frequency channels when operating without advertising channels. In contrast, IEEE 802.15.4 may instead use a direct sequence spread spectrum technique. For example, a device may establish a wireless channel using IEEE 802.15.4 by mixing a signal for the wireless channel with a pseudo-random code which is then extracted by a receiver from an external device. Direct sequence spread spectrum may help to enhance the signal-to-noise ratio by spreading the transmitted signal across a wide band. In some examples, a device establishing a wireless channel using IEEE 802.15.4 may be configured to scan for a clear spectrum.

Smart home devices may deploy many different wireless protocols to address the needs to the smart home. There are standards based protocols (Wi-Fi™, Zigbee™, Thread™, Zwave™, BLUETOOTH, DECT™, etc.) and proprietary, manufacture specific protocols. The issue with this array of protocols is that each protocol is tuned to a specific application. For example, Wi-Fi™ may be particularly useful for high bandwidth data applications that do not require long battery life. Zigbee™ may be particularly useful for low bandwidth data applications to maximize battery life. Additionally, not every wireless protocol is globally compliant. For example, Zwave™ may have different hardware designs for various operational regions.

Smart home systems may include a collection of different networks that operate at a common frequency suitable for home networks. For example, a Wi-Fi™ network of a smart home system, a BLUETOOTH network of the smart home system, and an IEEE 802.15.4 network of the smart home system may each operate at a 2.4 GHz frequency. A hub device may allocate each device to a time slot, also referred to herein as simply "slot," of the superframe during a registration process. For example, the hub device may allocate a Wi-Fi™ slot to one or more first devices, a BLUETOOTH slot to one or more second devices, and an IEEE 802.15.4 slot to one or more third devices. In this example, the hub device may output the superframe using a beacon that specifies a beginning of the superframe. All devices of the network may synchronize to the beacon and output data at the 2.4 GHz frequency according to the allocated slots of the superframe. For instance, the one or more first devices output data in accordance with the Wi-Fi™ protocol during the Wi-Fi™ slot, the one or more second devices output data in accordance with the BLUETOOTH protocol during the BLUETOOTH slot, and the one or more third devices output data in accordance with the IEEE 802.15.4 protocol during the 802.15.4 slot.

In accordance with the techniques of the disclosure, rather than using a fixed superframe mode, the hub device may dynamically adjust a superframe mode. For example, the hub device may be configured to use a first superframe mode for devices operating in North America and a second superframe mode for devices operating in Europe. In some examples, the hub device may be configured to use a first superframe mode for comfort devices (e.g., a thermostat) and a second superframe mode for security devices. The hub device may be configured to use a first superframe mode when a device is outputting low bandwidth data (e.g., telemetry information) and a second superframe mode when the device is outputting high bandwidth data (e.g., video and/or audio content). A hub device that dynamically adjusts a superframe mode may increase a bandwidth of the network compared to hub devices that use a fixed superframe mode.

FIG. 1A is a conceptual diagram illustrating devices in communication using an initial superframe mode, in accordance with some examples of this disclosure. In some examples, the initial superframe mode is a time divisional multiple access (TDMA) superframe mode. While system 10 illustrates only hub device 12 and sensor devices 14A-14N (collectively, "sensor devices 14" or simply "devices 14"), system 10 may include additional devices (e.g., devices in wireless communication with each other) or fewer devices. System 10 may be installed within a building and the surrounding premises (collectively, "premise").

Hub device 12 may include a computing device configured to operate one or more systems within a building, such as comfort, security, and/or safety systems. For example, as described further below, hub device 12 may include processing circuitry 15 configured to receive data, such as received from one or more devices and/or from user input, and process the data in order to automate one or more systems within a building. For example, hub device 12 may automate, control, or otherwise manage systems including heating and cooling, ventilation, illumination, or authorized access to individual rooms or other regions, as non-limiting examples. For example, hub device 12 may include a "Life and Property Safety Hub®" of Resideo Technologies, Inc.®, of Austin, Tex. Hub device 12 may include a wired connection to an electric power grid, but in some examples may include an internal power source, such as a battery, supercapacitor, or another internal power source.

Sensor devices 14 may be configured to enroll with hub device 12. For example, sensor device 14 may be configured to exchange sensor data with hub device 12 and/or be controlled by hub device 12. Sensor devices 14 may be configured to collect or generate sensor data, and transmit the sensor data to hub device 12 for processing. In some examples, sensor device 14 may include a controllable device. A controllable device may be configured to perform a specified function when the controllable device receives instructions (e.g., a command or other programming) to perform the function from hub device 12. Examples of different types of sensor devices 14 are included in the description of FIG. 2, below. Sensor devices 14 may include either a wired connection to an electric power grid or an internal power source, such as a battery, supercapacitor, or another internal power source.

Processing circuitry 15 may be configured to communicate with sensor devices 14 using one or more wireless communication protocols. Examples of wireless communication protocols may include, but not limited to, a low-power wireless connection protocol, a high-bandwidth connection protocol, or a local area networking protocol. Examples of a low-power connection protocol may include, but are not limited to, IEEE 802.15.4, a low power protocol using a 900 MHz frequency band, or another low-power connection protocol. As used herein, IEEE 802.15.4 may include any standard or specification compliant with IEEE 802.15.4, such, as for example, Zigbee™, ISA100.11a™, WirelessHART™, MiWi™ 6LoWPAN™, Thread™, SNAP™, and other standards or specifications that are compliant with IEEE 802.15.4. That is, for example, IEEE 802.15.4 should be interpreted herein as including implementations relying only on the IEEE 802.15.4 standard as well as implementations that build upon the IEEE 802.15.4 standard with additional specifications, such as, for example, Zigbee™. Examples of a high-bandwidth connection protocol may include, for example, BLUETOOTH (e.g., classic BLUETOOTH, BLUETOOTH low energy, etc.). Examples of a local area networking protocol may include, for example, Wi-Fi™ (e.g., IEEE 802.11 a/b/g/n/ac, etc.).

Although FIG. 1A shows hub device 12 as directly connected to sensor devices 14, in some examples, system 10 may include one or more repeater nodes that are each configured to act as an intermediary or "repeater" device. For example, sensor device 14A may output first data in accordance with Wi-Fi™ to a first repeater device, which outputs the first data to hub device 12. In this example, sensor device 14B may output second data in accordance with BLUETOOTH to a second repeater device, which outputs the second data to hub device 12. The first repeater device and the second repeater device may be the same device (e.g., a device configured to communicate in accordance with BLUETOOTH and in accordance with Wi-Fi™) or may be separate devices.

Processing circuitry 15 may be configured to use TDMA for communication in system 10. For example, a Wi-Fi™ network of a smart home system, a BLUETOOTH network of the smart home system, and an IEEE 802.15.4 network of the smart home system may operate at a 2.4 GHz frequency (e.g., within a band of frequencies comprising 2.4 GHz). In this example, processing circuitry 15 may register each of devices 14 to a slot of a superframe. For example, processing circuitry 15 may allocate sensor device 14A to a first slot of a superframe 16, also referred to herein as simply "superframe 16," for a group of devices and allocate sensor device 14N to a second slot of superframe 16 for a group of devices. Processing circuitry 15 may "output" superframe 16 by outputting a beacon signaling the beginning of the superframe. Each one of sensor devices 14 may synchronize with the beacon and output data according to the slots defined by the superframe. In some examples, processing circuitry 15 may periodically output superframe 16 to allow sensor devices 14 to output data.

Hub device 12 may allocate multiple devices to a single slot of a superframe, but possibly at different portions of the single slot. For example, hub device 12 may allocate sensor device 14A to a first 4 ms portion of an IEEE 802.15.4 slot and allocate sensor device 14N to a second 4 ms portion of the IEEE 802.15.4 slot that is different from the first 4 ms portion of the IEEE 802.15.4 slot. In some examples, hub device 12 may allocate sensor device 14A to a first channel (e.g., 2.402 GHz) of a BLUETOOTH slot and allocate sensor device 14N to a second channel (e.g., 2.479 GHz) of the BLUETOOTH slot that is different from the first channel.

Processing circuitry 15 may use multiple superframes. For example, processing circuitry 15 may allocate sensor device 14A to a slot of a first superframe for a first group of devices and allocate sensor device 14N to a slot of a second superframe for a second group of devices. Processing circuitry 15 may output the first superframe by outputting a first beacon signaling the beginning of the first superframe. In response to the first beacon, sensor device 14A may output data according to the slots defined by the first superframe while sensor device 14N refrains from outputting data during the first superframe. In this example, processing output the second superframe by outputting a second beacon signaling the beginning of the second superframe. In response to the second superframe, sensor device 14A may refrain from outputting data and sensor device 14B may output data according to the slots defined by the second superframe. Processing circuitry 15 may periodically output the first superframe and the second superframe to allow sensor devices 14 to output data.

In some systems, a hub device may use a single superframe mode for each superframe. For example, the hub device may allocate time for Wi-FI™ and IEEE 802.15.4 communication when a system has video data to communicate over BLUETOOTH. In this example, maintaining the time allocated to Wi-Fi™ and/or IEEE 802.15.4 may reduce a bandwidth of the network compared to systems that dynamically increase an amount of time for BLUETOOTH communication when a system has video data to communicate over BLUETOOTH.

Rather than using a single superframe mode, hub device 12 may be configured to use multiple superframe modes, each superframe mode allocating each slot of a plurality of slots for wireless communication to a first protocol, a second protocol, or a third protocol. In some examples, the first protocol, the second protocol, and the third protocol are different from each other. For example, the first protocol may include a local area networking protocol, the second protocol may include a low-power wireless connection protocol, and/or the third protocol may include a high-bandwidth connection protocol. For instance, the first protocol may include Wi-Fi™. In some examples, the second protocol may include IEEE 802.15.4. The third protocol may include BLUETOOTH.

For example, hub device 12 may be configured to use a comfort normal superframe mode that supports 64 devices with 4 ms alarm slots. In some examples, hub device 12 may be configured to use a comfort BLUETOOTH pairing superframe mode that allocates extra time (e.g., 40 ms) for BLUETOOTH pairing. In some examples, hub device 12 may be configured to use a mutually exclusive comfort BLUETOOTH pairing superframe mode that allocates extra time (e.g., 72 ms) for BLUETOOTH pairing. In some examples, hub device 12 may be configured to use a BLUETOOTH high bandwidth superframe mode that allocates extra time (e.g., 40 ms) for BLUETOOTH communications. In some examples, hub device 12 may be configured to use a Wi-Fi™ pairing superframe mode that allocates extra time (e.g., 101 ms) for Wi-Fi™ communications. In some examples, hub device 12 may be configured to use a security normal superframe mode that supports 128 devices with 2 ms alarm slots. In some examples, hub device 12 may be configured to use a security BLUETOOTH pairing superframe mode that allocates extra time for BLUETOOTH pairing. Hub device 12 may be configured to use any number of superframe modes (e.g., 6, more than 6, etc.). The foregoing examples of superframe modes are for example purposes only. For example, hub device 12 may additionally or alternatively use other superframe modes.

In accordance with the techniques of the disclosure, processing device 15 may output initial superframe 16 configured in an initial superframe mode. For example, processing circuitry 15 may output the initial superframe 16 by outputting a first beacon signaling the beginning of the initial superframe 16. In response to the first beacon, sensor device 14A may output data according to the slots defined by initial superframe 16 and sensor device 14B may output data according to the slots defined by initial superframe 16. Initial superframe 16 may be in any superframe mode. For example, initial superframe 16 may be a comfort normal superframe mode that supports 64 devices with 4 ms alarm slots.

Figure 1B:
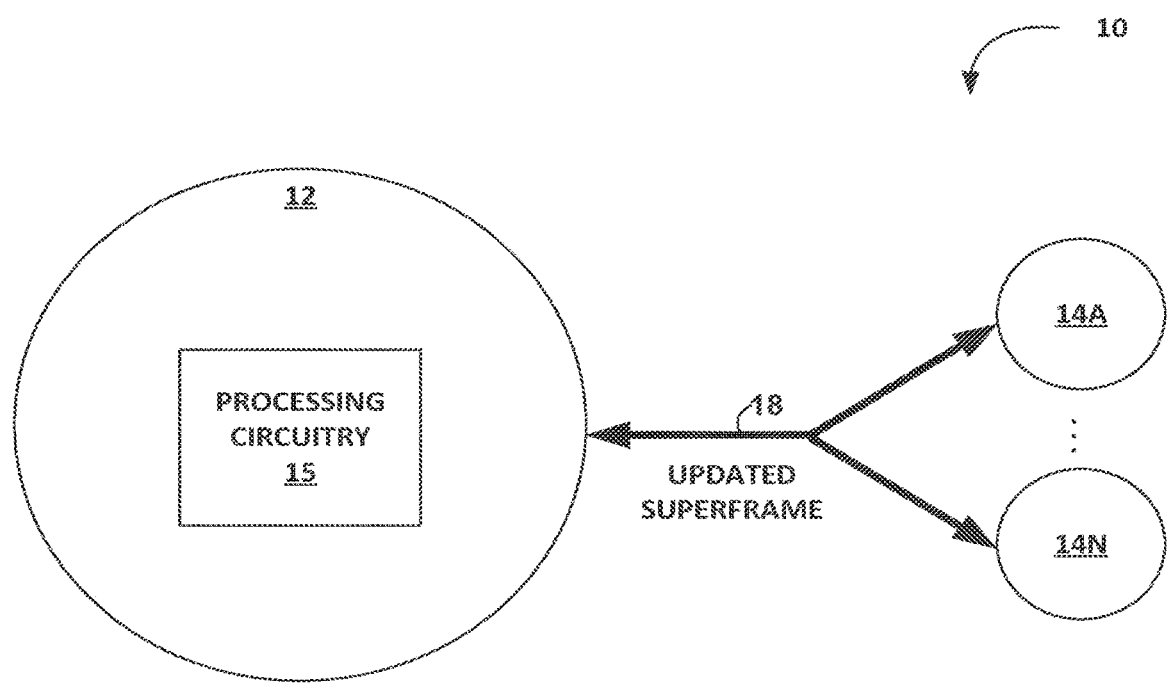
FIG. 1B is a conceptual diagram illustrating devices in communication using an updated superframe mode, in accordance with some examples of this disclosure.

FIG. 1B is a conceptual diagram illustrating devices in communication using an updated superframe mode, in accordance with some examples of this disclosure. Processing circuitry 15 may determine a change in bandwidth allocated in initial superframe 16. For example, in response to a BLUETOOTH pairing request, processing circuitry 15 may determine to change bandwidth allocated to one or more of the first protocol, the second protocol, or the third protocol in initial superframe 16. For instance, processing circuitry 15 may determine to increase bandwidth allocated to BLUETOOTH communication compared to an amount of bandwidth allocated to BLUETOOTH communication in initial superframe 16.

In response to determining a change in bandwidth allocated to one or more of the first protocol, the second protocol, or the third protocol, processing circuitry 15 may select an updated superframe mode 18 from that is different from the initial superframe mode of initial superframe 16. For example, processing circuitry 15 may have outputted initial superframe 16 in a comfort normal superframe mode. In this example, processing circuitry 15 may select the comfort BLUETOOTH pairing superframe mode. Processing circuitry 15 outputs an updated superframe 18 configured for the updated superframe mode. For example, processing circuitry 15 may output updated superframe 18 in the comfort BLUETOOTH pairing superframe mode.

Figure 2:
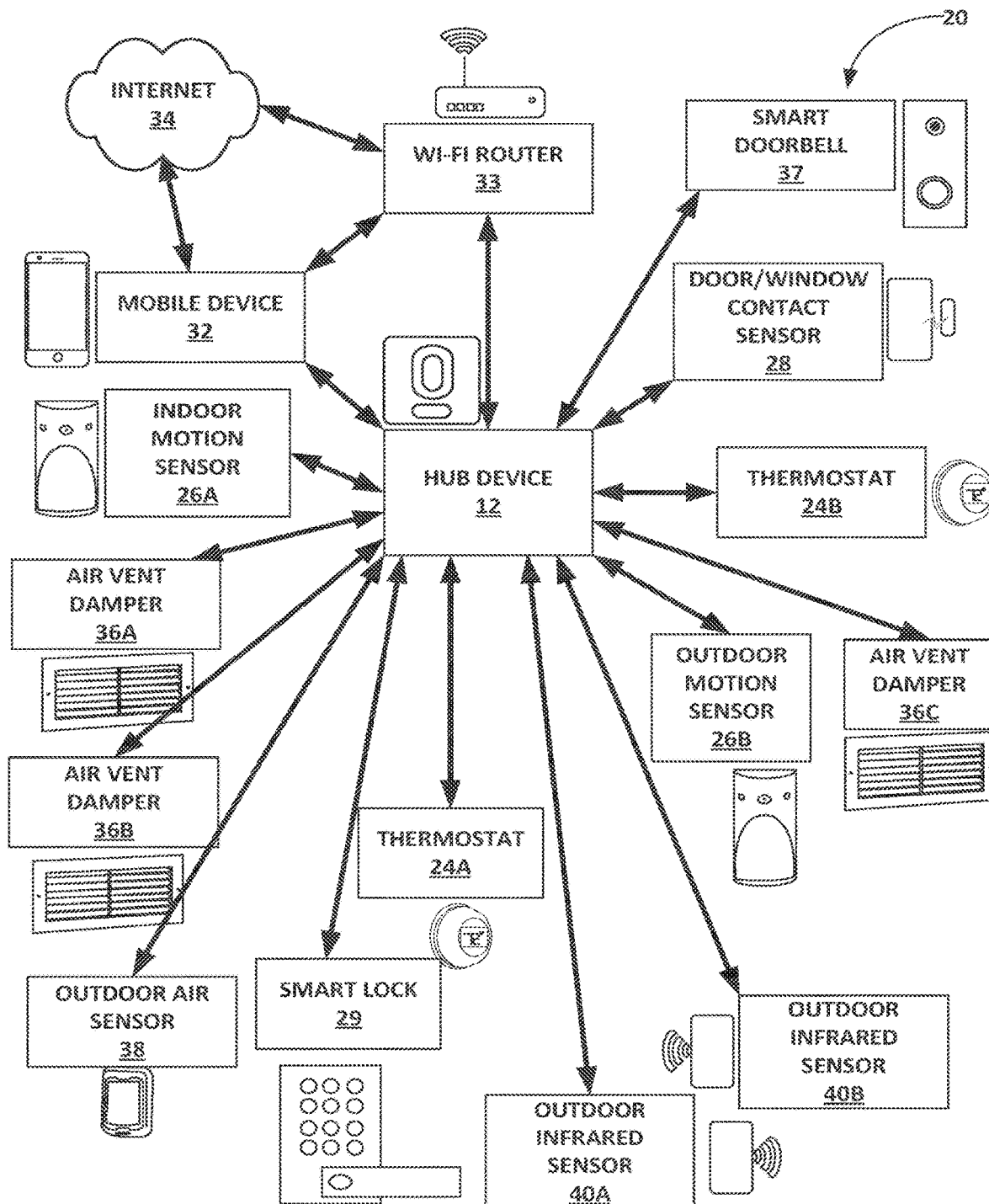
FIG. 2 is a conceptual block diagram illustrating an example of a home network, in accordance with some examples of this disclosure.

FIG. 2 is a conceptual block diagram illustrating a networked system 20, which may be one example of the networked system 10 of FIG. 1, in accordance with some examples of this disclosure. System 20 includes hub device 12, thermostat 24A, thermostat 24B (collectively, thermostats 24), indoor motion sensor 26A, outdoor motion sensor 26B (collectively, motion sensors 26), door/window contact sensor 28, air vent damper 36A, 36B, 36C (collectively, air vent dampers 36), smart doorbell 37, outdoor air sensor 38, outdoor infrared sensor 40A, indoor infrared sensor 40B (collectively, infrared sensors 40), router 33, and mobile device 32. While hub device 12 is shown as a distinct component, hub device 12 may be integrated into one or more of thermostats 24, motion sensors 26, door/window contact sensor 28, air vent dampers 36, smart doorbell 37, outdoor air sensor 38, and infrared sensors 40. The various devices of system 20 are for example purposes only. For example, additional devices may be added to system 20 and/or one or more devices of system 20 may be omitted.

System 20 is a non-limiting example of the techniques of this disclosure. Other example systems may include more, fewer, or different components and/or devices. While FIG. 2 illustrates a mobile phone, mobile device 32 may, in some examples, include a tablet computer, a laptop or personal computer, a smart watch, a wireless network-enabled key fob, an e-readers, or another mobile device. Mobile device 32 and/or router 33 may be connected to a wide area network, such as, for example, internet 34. Internet 34 may represent a connection to the Internet via any suitable interface, such as, for example, a digital subscriber line (DSL), dial-up access, cable internet access, fiber-optic access, wireless broadband access, hybrid access networks, or other interfaces. Examples of wireless broadband access may include, for example, satellite access, WiMax™, cellular (e.g., 1×, 2G, 3G™ 4G™ 5G™, etc.), or another wireless broadband access.

Central hub device 12 may be in wireless data communication with thermostats 24, motion sensors 26, door/window contact sensor 28, air vent dampers 36, smart doorbell 37, outdoor air sensor 38, and infrared sensors 40. For example, thermostats 24, motion sensors 26, door/window contact sensor 28, air vent dampers 36, smart doorbell 37, outdoor air sensor 38, and infrared sensors 40 may be directly connected to hub device 12 using one or more wireless channels according to a connection protocol, such as, but not limited to, for example, IEEE 802.15.4, BLUETOOTH, or another connection protocol.

Each of thermostats 24, motion sensors 26, door/window contact sensor 28, air vent dampers 36, smart doorbell 37, outdoor air sensor 38, and infrared sensors 40 may include either a sensor device (e.g., a device configured to collect and/or generate sensor data), a controllable device, or both, as described herein. For example, thermostats 24 may include comfort devices having sensors, such as a thermometer configured to measure an air temperature. In some examples, air vent dampers 36 may include devices located within an air vent or air duct, configured to either open or close the shutters of an air vent in response to receiving instructions from hub device 12.

Although not shown in the example of FIG. 2, central hub device 12 may be in indirect wireless data communication (e.g., communication via a repeater node) with one or more of thermostats 24, motion sensors 26, door/window contact sensor 28, air vent dampers 36, smart doorbell 37, outdoor air sensor 38, and infrared sensors 40. For example, outdoor air sensor 38 may be indirectly connected thermostat to hub device 12 using a wireless channel according to a connection protocol, such as, but not limited to, for example, IEEE 802.15.4, BLUETOOTH, or another connection protocol. For instance, outdoor air sensor 38 may be connected to hub device 12 via thermostat 24A, outdoor infrared sensor 40A may be connected to hub device 12 via outdoor motion sensor 26B, etc.

Thermostats 24 may be configured to wirelessly transmit the temperature (e.g., sensor data) directly to hub device 12. Additionally, thermostats 24 may include controllable devices, in that they may activate or deactivate a heating, cooling, or ventilation system in response to receiving instructions from hub device 12. For example, thermostat 24A may collect temperature data and transmit the data to hub device 12. Hub device 12, in response to receiving the temperature data, may determine that a respective room is either too hot or too cold based on the temperature data, and transmit a command to thermostat 24A to activate a heating or cooling system as appropriate. In this example, each of thermostats 24 may include both sensor devices and controllable devices within a single distinct unit.

Indoor and outdoor motion sensors 26 may include security devices configured to detect the presence of a nearby mobile object based on detecting a signal, such as an electromagnetic signal, an acoustic signal, a magnetic signal, a vibration, or other signal. The detected signal may or may not be a reflection of a signal transmitted by the same device. In response to detecting the respective signal, motion sensors 26 may generate sensor data indicating the presence of an object, and wirelessly transmit the sensor data to hub device 12. Hub device 12 may be configured to perform an action in response to receiving the sensor data, such as outputting an alert, such as a notification to mobile device 32, or by outputting a command for the respective motion sensor 26 to output an audible or visual alert. In this example, each of motion sensors 26 may include both sensor devices and controllable devices within a single unit.

Door and/or window contact sensor 28 may include a security device configured to detect the opening of a door or window on which the door and/or window contact sensor 28 is installed. For example, contact sensor 28 may include a first component installed on a door or window, and a second component installed on a frame of the respective door or window. When the first component moves toward, past, or away from the second component, the contact sensor 28 may be configured to generate sensor data indicating the motion of the door or window, and wirelessly transmit the sensor data to hub device 12. In response to receiving the sensor data, hub device may be configured to perform an action such as outputting an alert, such as a notification to mobile device 32, or by outputting a command for the respective contact sensor 28 to output an audible or visual alert. In this example, contact sensor 28 may include a sensor devices and a controllable devices within a single unit.

Air vent dampers 36 may be configured to regulate a flow of air inside of a duct. For example, thermostats 24 may generate a control signal to close air vent damper 36A (e.g., when the room is not occupied). In this example, in response to the control signal, air vent damper 36 may close to prevent air from flowing from air vent damper 36A. In some examples, air vent dampers 36 may send sensor data indicating a state (e.g., open or closed) of the respective air vent damper. For instance, air vent damper 36 may output, to thermostats 24 an indication that air vent damper 36 is in an open state.

Smart doorbell 37 may be configured to provide notifications to hub device 12. For example, smart doorbell 37 may be configured to provide a notification (e.g., message) when a button (e.g., doorbell) of smart doorbell 37 is activated. In some examples, smart doorbell 37 may include motion sensor circuitry configured to generate a notification in response to motion detected near smart doorbell 37. In some examples, smart doorbell 37 may be configured to generate video content in response to motion detected near smart doorbell 37. In some examples, smart doorbell 37 may be configured to generate audio content in response to motion detected near smart doorbell 37. For instance, in response to motion detected near smart doorbell 37, smart doorbell 37 may generate video content using a camera and/or audio content using a microphone. In this instance, smart doorbell 37 may output the video content and audio content to hub device 12, which may forward the video content and/or audio content to mobile device 32.

Outdoor air sensor 38 may be configured to generate sensor data indicating, for example, a temperature, humidity, and/or quality (e.g., carbon monoxide, particulate matter, or other hazards) of the surrounding air. In some examples, outdoor air sensor 38 may wireless transmit the sensor data to hub device 12. For instance, outdoor air sensor 38 may periodically output a current or average temperature to thermostats 24 via hub device 12.

Outdoor passive infrared sensors 40 may include security devices configured to detect the presence of a nearby object, such as a person, based on detecting infrared wavelength electromagnetic waves emitted by the object. In response to detecting the infrared waves, passive infrared sensors 40 may generate sensor data indicating the presence of the object, and wirelessly transmit the sensor data to hub device 12. Hub device 12 may be configured to perform an action in response to receiving the sensor data, such as outputting an alert, such as a notification to mobile device 32, or by outputting a command for the respective passive infrared sensor 40 to output an audible or visual alert.

System 20 may include various devices, including, for example, a security device, a water heater, a water flow controller, a garage door controller, or other devices. For example, system 20 may include one or more of: a door contact sensor, a motion passive infrared (PIR) sensor, a mini contact sensor, a key fob, a smoke detector, a glass break detector, a siren, a combined smoke detector and Carbon monoxide (CO) detector, an indoor siren, a flood sensor, a shock sensor, an outdoor siren, a CO detector, a wearable medical pendant, a wearable panic device, an occupancy sensor, a keypad, and/or other devices.

In accordance with the techniques of the disclosure, hub device 12 and each of thermostats 24, motion sensors 26, door/window contact sensor 28, air vent dampers 36, smart doorbell 37, outdoor air sensor 38, and infrared sensors 40 may be configured to operate using a superframe. While various examples described herein use Wi-Fi™ as an example of a first protocol, IEEE 802.15.4 as an example second protocol, and BLUETOOTH as an example of third protocol, in some examples, other protocols may be used. Smart doorbell 37 is used as an example sensor device for example purposes only, and the other devices illustrated in FIG. 2 may operate in a similar, including identical, manner. In some examples, the first protocol, the second protocol, and the third protocol are different from each other. For example, the first protocol may include a local area networking protocol, the second protocol may include a low-power wireless connection protocol, and/or the third protocol may include a high-bandwidth connection protocol. For instance, the first protocol may include Wi-Fi™. In some examples, the second protocol may include IEEE 802.15.4. The third protocol may include BLUETOOTH.

Hub device 12 may assign smart doorbell 37 to a first group. In this example, hub device 12 may output an initial superframe configured for an initial superframe mode. For example, the initial superframe mode may allocate a first BLUETOOTH time slot of 101 ms out of 245 ms. For instance, hub device 12 may output a beacon indicating a beginning of the initial superframe. In this example, smart doorbell 37 may output data during the first BLUETOOTH time slot in compliance with the BLUETOOTH protocol.

In response to a detection of movement near smart doorbell 37, smart doorbell 37 may output an indication that video content will be sent to hub device 12 in accordance with the BLUETOOTH protocol. In response to the indication that video content will be sent to hub device 12 in accordance with the BLUETOOTH protocol, hub device 12 may select a BLUETOOTH streaming superframe that allocates 141 ms to BLUETOOTH communications. Hub device 12 may output an updated superframe configured in the BLUETOOTH streaming superframe mode.

Figure 3:
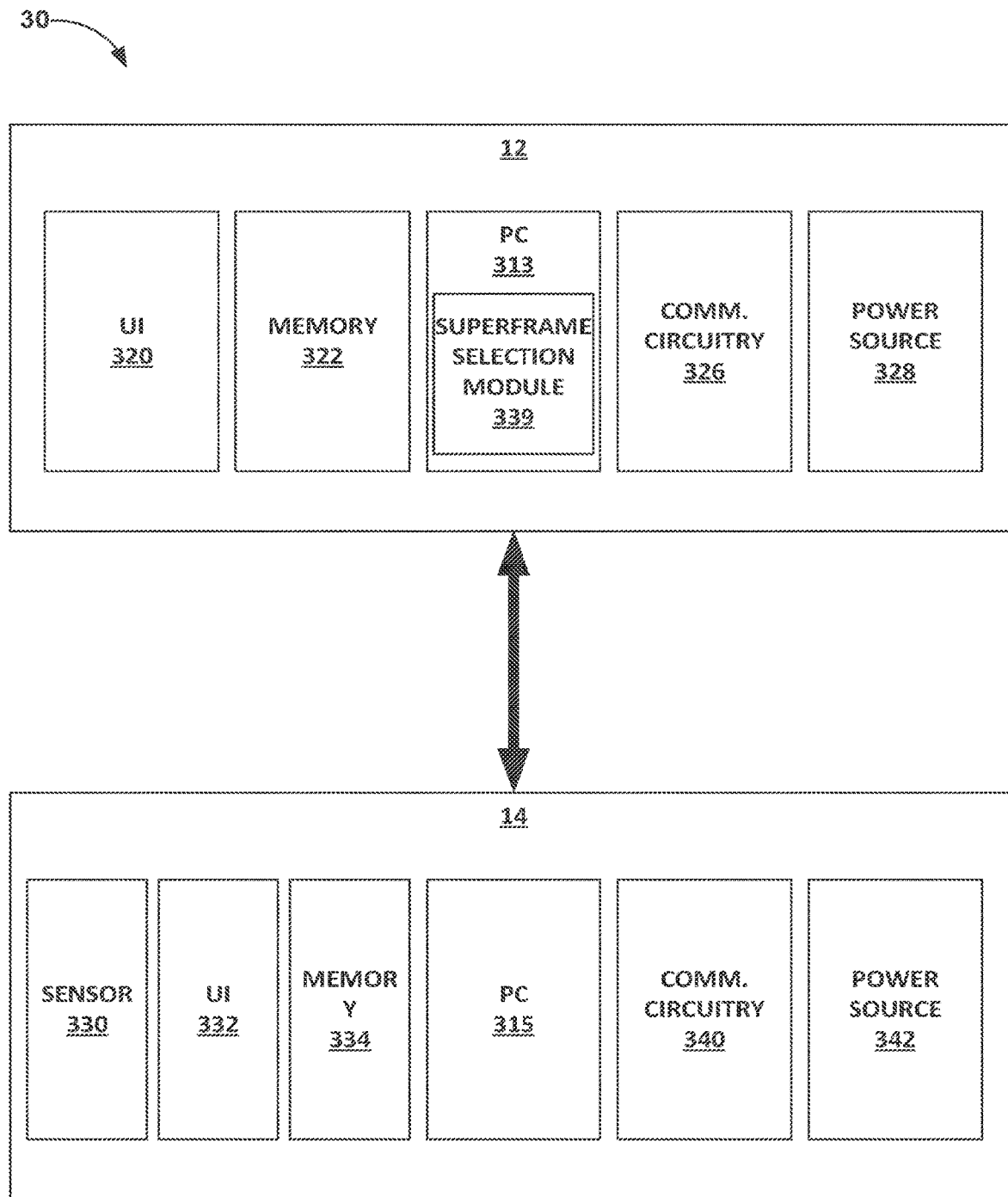
FIG. 3 is a conceptual block diagram of a hub device and a sensor device, in accordance with some examples of this disclosure.

FIG. 3 is a conceptual block diagram of a hub device 12 and a sensor device 14, in accordance with some examples of this disclosure. System 30 may be an example of any of the previous systems 10, 20, or another system. System 30 includes hub device 12 and sensor device 14.

Hub device 12 may include at least a user interface (UI) 320, a memory 322, processing circuitry (PC) 313, communication circuitry 326 ("COMM. CIRCUITRY"), and a power source 328. UI 320 is configured to receive data input from, or output data to, a user. For example, UI 320 may include a display screen, such as a touchscreen, keyboard, buttons, microphone, speaker, camera, or any other user input/output device. Other examples of UI 320 are possible. For example, during an initial setup process, hub device 12 may "scan" a local proximity in order to identify one or more other devices (e.g., devices having recognizable wireless communication capabilities), and then output for display on a display screen a list of the discovered devices for selection by a user. Via UI 320, a user may also specify one or more parameters in order to control or otherwise manage a comfort and/or security system within a building and the surrounding premises. For example, via UI 320, a user may specify one or more air temperature settings or security settings, such as access codes and/or authorized users.

Hub device 12 includes a memory 322 configured to store data, as well as instructions that, when executed by processing circuitry 313, cause hub device 12 to perform one or more techniques in accordance with this disclosure. Communication circuitry 326 may include components, such as an antenna, configured to wirelessly transmit and receive data according to one or more wireless communication protocols. For example, communication circuitry 326 may be configured to transmit and/or receive data according to the IEEE 802.15.4 protocol, Wi-Fi™, and/or the BLUETOOTH protocol where appropriate, according to one or more constraints of the respective data communication protocols (e.g., communication range, energy requirements, etc.).

Power source 328 may include a wired connection to an electric power grid, due to the energy-intensive operations performed by hub device 12. However, in some examples, power source 328 may additionally or alternatively include an internal power source, such as a battery or supercapacitor. In the example of FIG. 3, hub device 12 omits a sensor, however, in some examples, hub device 12 may further include one or more sensors. Additionally, hub device 12 may be configured as a repeater node.

Sensor device 14 may be configured to wirelessly communicate with hub device 12. Sensor device 14 may include an incorporated sensor 330, a UI 332, a memory 334, processing circuitry (PC) 315, communication circuitry 340, and a power source 342. In some examples, sensor device 14 may include an incorporated sensor device, such as a motion sensor; passive infrared (PIR) sensor; air temperature and/or humidity sensor; air quality (e.g., carbon monoxide or particulate matter) sensor; or a door or window contact sensor, as non-limiting examples. Processing circuitry 313 may include wireless protocol selection module 339 that may be configured to select a first wireless protocol or a second wireless protocol for establishing a wireless connection. In some examples, wireless protocol selection module 339 may be configured to select between three or more wireless protocols for establishing a wireless connection UI 330 is configured to receive data input from, or output data to, a user. For example, UI 330 may include a display screen, such as a touchscreen, keyboard, buttons, microphone, speaker, camera, or any other user input/output device. Other examples of UI 330 are possible. For example, during an initial setup process, sensor device 14 may "scan" a local proximity in order to identify one or more hub devices and/or other devices (e.g., devices having recognizable wireless communication capabilities), and then output for display on a display screen a list of discovered devices for selection by a user. Via UI 330, a user may also specify one or more parameters in order to control or otherwise manage a comfort and/or security system within a building and the surrounding premises. For example, via UI 330, a user may specify one or more air temperature settings (e.g., for a thermostat) or security settings, such as access codes and/or authorized users. Sensor device 14 includes a memory 334 configured to store data, as well as instructions that, when executed by processing circuitry 315, cause sensor device 14 to perform one or more techniques in accordance with this disclosure.

Processing circuitry 315 and hub device 12 may exchange network parameters for pairing a BLUETOOTH channel. For example, processing circuitry 315 may determine (e.g., receive from hub device 12 or generate for output to hub device 12), one or more of: (1) a media access control (MAC) address of host device 22 and a MAC address of thermostat 24A; (2) a real time-point in time for the transfer to start (or offset from 802.15.4 start command); (3) an indication of a starting frequency; (4) an indication of a hop set; (5) a connection interval; or (6) a connection latency.

For example, processing circuitry 315 and hub device 12 may exchange a MAC address for device 12 and a MAC address for sensor device 14. In this example, communication circuitry 326 and communication circuitry 340 may be configured to establish a BLUETOOTH channel between the MAC address for hub device 12 and the MAC address for sensor device 14.

In some examples, processing circuitry 315 and hub device 12 may exchange an indication of a particular time to establish the BLUETOOTH channel. In this example, communication circuitry 326 and communication circuitry 340 may be configured to establish the BLUETOOTH channel between hub device 12 and sensor device 14 at the particular time.

For example, processing circuitry 315 and hub device 12 may exchange an indication of a starting frequency to establish the BLUETOOTH channel. In this example, communication circuitry 326 and communication circuitry 340 may be configured to establish a BLUETOOTH channel between hub device 12 and sensor device 14 at the starting frequency. For instance, the BLUETOOTH channel between hub device 12 and sensor device 14 may include 40 1 MHz wide channels that are separated by 2 MHz. In this example, the starting frequency may be an indication of a particular 1 MHz wide channel (e.g., channel 0, 1, . . . 39) and communication circuitry 326 and communication circuitry 340 may be configured to establish a BLUETOOTH channel between hub device 12 and sensor device 14 at the particular 1 MHz wide channel. The various frequencies of BLUETOOTH channels of BLUETOOTH channels, while slightly different from each other, may all correspond to a frequency for a superframe (e.g., 2.4 GHz).

Processing circuitry 315 and hub device 12 may exchange an indication of a hop set for the BLUETOOTH channel, the hop set indicating a sequence of frequencies. In this example, communication circuitry 326 and communication circuitry 340 may be configured to establish a BLUETOOTH channel between hub device 12 and sensor device 14 to operate at the sequence of frequencies. For instance, the BLUETOOTH channel between hub device 12 and sensor device 14 may include 40 1 MHz wide channels that are separated by 2 MHz. In this example, the sequence of frequencies may be an indication of an order for switching between the 1 MHz wide channels (e.g., channel 0, 1, . . . 39) and communication circuitry 326 and communication circuitry 340 may be configured to establish a BLUETOOTH channel between hub device 12 and sensor device 14 that selects a 1 MHz wide channel according to the order for switching between the 1 MHz wide channels.

In some examples, processing circuitry 315 and hub device 12 may exchange an indication of a connection interval for the BLUETOOTH channel. In this example, communication circuitry 326 and communication circuitry 340 may be configured to establish a BLUETOOTH channel between hub device 12 and sensor device 14 to operate at the connection interval. For instance, rather than exchanging data at any time on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at the connection interval.

Processing circuitry 315 and hub device 12 may exchange an indication of a connection latency for the BLUETOOTH channel. In this example, communication circuitry 326 and communication circuitry 340 may be configured to establish a BLUETOOTH channel between hub device 12 and sensor device 14 to operate at the connection latency. For instance, rather than exchanging data at any time or at a connection interval on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at a latency interval of sensor device 14 or hub device 12. This latency interval may be selected to reduce a time a radio of sensor device 14 and/or hub device 12 listens for data (further from a connection interval), which may reduce a power consumption of sensor device 14 and/or hub device 12 compared to systems that omit a latency interval or use a zero latency interval.

Processing circuitry 315 and hub device 12 may exchange an indication of antenna information for a plurality of antennas at sensor device 14. In this example, communication circuitry 326 and communication circuitry 340 may be configured to select a particular antenna from the plurality of antennas based on the antenna information and to establish a BLUETOOTH channel between hub device 12 and sensor device 14 using the particular antenna.

Hub device 12 and sensor device 14 may be configured to operate using a superframe. For example, sensor device 14 may output an enrollment signal to hub device 12. Hub device 12 may assign sensor device 14 a group number and output an indication of the group number to sensor device 14. Hub device 12 may then control a timing of communications using the superframe. For example, hub device 12 may specify a start of a superframe using a beacon and identify devices that may communicate by specifying a group assigned to the superframe. In this way, sensor device 14 may determine when to output data. For example, sensor device 14 may, in response to a beacon output by hub device 12 indicating the group number assigned to sensor device 14, output data in accordance with the superframe.

Superframe selection module 339 may select a superframe mode. In some examples, superframe selection module 339 may select a superframe mode based on configuration data received by hub device 12. For example, superframe selection module 339 may select a set of superframe modes for the North America region when superframe selection module 339 determines that hub device 12 is arranged in the North America region. Similar, superframe selection module 339 may select a set of superframe modes for the European region when superframe selection module 339 determines that hub device 12 is arranged in the European region.

Superframe selection module 339 may select a superframe mode based on operating parameters of system 30. For example, superframe selection module 339 may determine that sensor device 14 is attempting to pair (e.g., exchange a MAC address, channel hop set, etc.) with hub device 12 using BLUETOOTH. In this example, superframe selection module 339 may select a superframe mode that allocates additional time to BLUETOOTH communications. Allocating additional time to BLUETOOTH for pairing may improve a likelihood that a pairing operation will be successful. In this way, superframe selection module 339 may improve a reliability and operation of system 30.

In some examples, superframe selection module 339 may determine that sensor device 14 is going to send high bandwidth data (e.g., audio and/or video content) to hub device 12 using BLUETOOTH. In this example, superframe selection module 339 may select a superframe mode that allocates additional time to BLUETOOTH communications. Allocating additional time to BLUETOOTH for audio and/or video content may improve a bandwidth of system 30.

Figure 4:
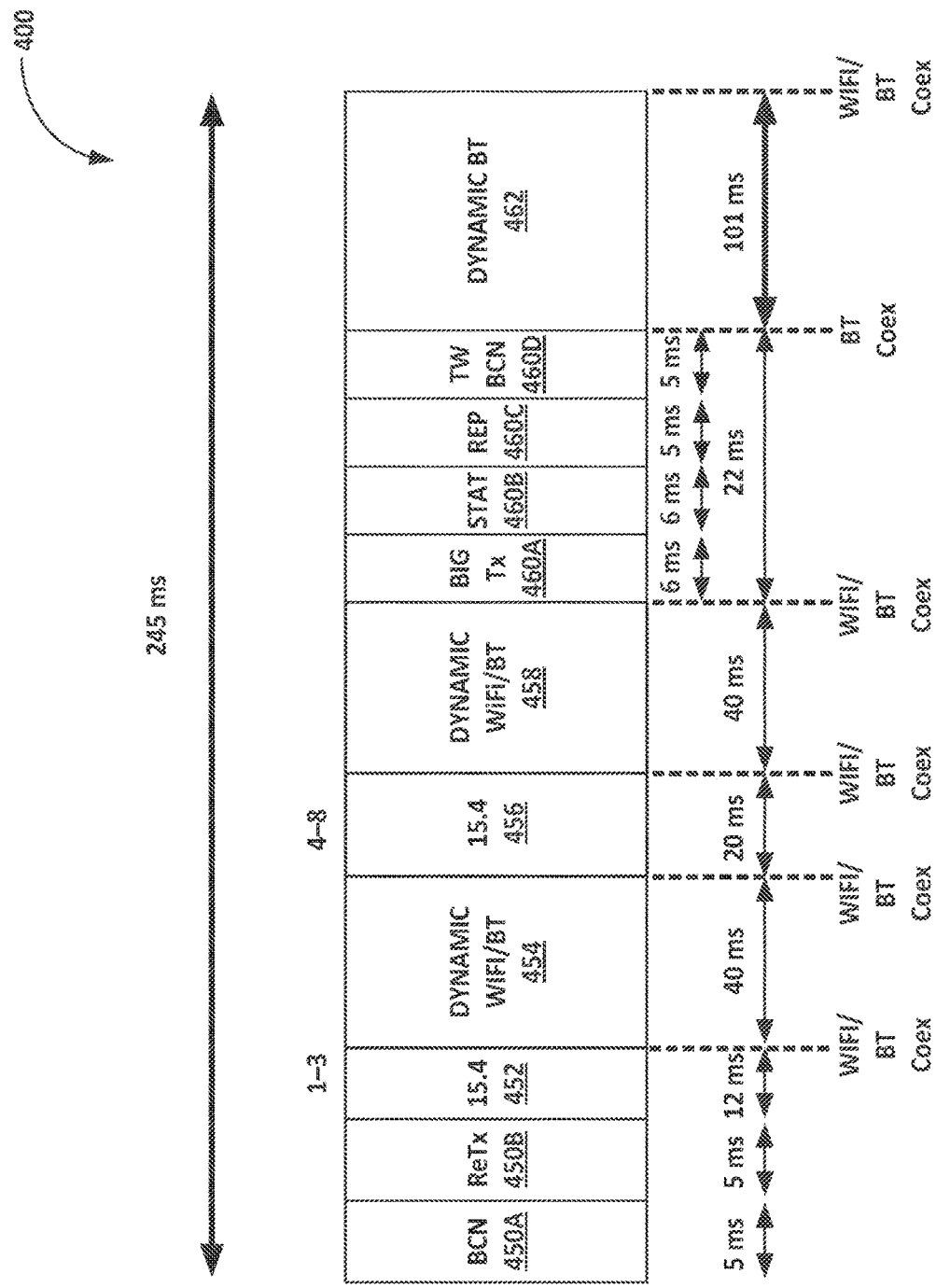
FIG. 4 is a conceptual block diagram of a first example of slots for superframe modes, in accordance with some examples of this disclosure.

FIG. 4 is a conceptual block diagram of a first example of slots for a superframe modes, in accordance with some examples of this disclosure. As shown, superframe 400 may include a beacon slot 450A ("BCN 450A") and a retransmission slot 450B ("ReTx"), which may be collectively referred to here as beacon slot A 450. The order of slots shown in FIG. 4 is for example purposes only. Timing shown in FIG. 4 is for example purposes only. For example, superframe 400 may be shorter than 245 ms or longer than 245 ms. Superframe 400 is for example purposes only. For example, a superframe may include different slots (e.g., one or more slots may be removed and/or one or more slots may be added) and/or may include slots of different widths (e.g., different durations) than superframe 400.

Beacon slot 450A may mark the beginning of superframe 400. Beacon slot 450A may be used by all the end devices (e.g., sensor devices 14) to synchronize to the coordinator (e.g., hub device 12). As such, all devices in the system may synchronize to a master clock of the coordinator (e.g., hub device 12) thus forming a time synchronized networking system. Beacon slot 450A may include information that is used by the end devices to understand the system status, respond to commands, or other information. The duration of beacon slot 450A may be 5 ms. The order of beacon slot 450A and a retransmission slot 450B shown in FIG. 4 is for example purposes only. Beacon slot A 450 may include additional or fewer slots. In some examples, the timing of beacon slot 450A may be less than 5 ms or more than 5 ms.

Retransmission slot 450B may be used for a new (e.g., non-enrolled) devices to associate with a coordinator (e.g., hub device 12) and thus become part of a personal area network (PAN), such as system 10, system 20, system 30 or another system. Once the enrollment mode is disabled, end devices of the previous superframe group may use retransmission 450B to attempt retransmission. The duration of retransmission slot 450B may be 5 ms.

15.4 slots 452 and 456 may be used for communications compliant with IEEE 802.15.4. In an example, there may be up to 2 or 4 15.4 slots in a superframe, however, other examples may use other combinations. Each slot may include sub-slots comprising a duration of, for example, 2 ms, 4 ms, 5, ms, etc. End devices (e.g., sensor devices 14) may use 15.4 slots 452 and 456 to transmit an alarm message, a status message, a Redlink™ network protocol (RNP) message, a supervision message, or other information. The total duration of each of 15.4 slot 452 and 15.4 slot 456 time segment may be, for example, 32 ms or 64 ms. The media access protocol for 15.4 slots 452 and 456 used may be TDMA. If a sensor device is not enrolled in a 15.4 slot, hub device 12 may allocated the 15.4 slots to Wi-Fi™ or BLUETOOTH.

Dynamic Wi-Fi™ BLUETOOTH slot 454 ("DYNAMIC Wi-FI™/BT 454") and dynamic Wi-Fi™ BLUETOOTH slot 458 ("DYNAMIC Wi-FI™/BT 458") may be referred to herein as a Wi-Fi™ coexistence time segments. A Wi-Fi™ time segment may be used by a Wi-Fi™ module populated on a thermostat device to transmit different types of network packets. Dynamic Wi-Fi™ BLUETOOTH slot 454, 458 may include alarm messages from the thermostat device to the central monitoring station, video streaming packets from one Wi-Fi™ client (e.g., camera or video capable sensor video/image) to another (e.g., GUI based touch screen/Cloud, etc.). The Wi-Fi™ might be operating in different modes: (a) Wi-Fi™ Client, (b) Wi-Fi™-AP, (c) Wi-Fi™-Hybrid. Wi-Fi™ slots may be dynamic, these slots may be shared to BLUETOOTH or Wi-Fi™ depending on different modes of superframes. As shown, dynamic Wi-Fi™ BLUETOOTH slot 454 and dynamic Wi-Fi™ BLUETOOTH slot 458 may be 40 ms.

Big TX/RX Slot 460A ("Big Tx 460A"), status slot 460B, repeater slot 460C ("REP 460C"), and twin beacon slot 460D ("TW BCN 460D") may be collectively referred to herein as beacon slot B 460. The order of Big TX/RX Slot 460A, status slot 460B, repeater slot 460C, and twin beacon slot 460D shown in FIG. 4 is for example purposes only. Beacon slot B 460 may include additional or fewer slots.

Big TX/RX Slot 460A may include one or more large data transmit slots that are each more than 10 bytes and may be up to 96 bytes. An access point (e.g., hub device 12) may be able to send any data to any device using this slot. Data can be unicast, broadcast or groupcast depending on a type of request. This mode of communication may be indicated in beacon A slot 450. Big TX/RX Slot 460A may be used to send over-network download (OND) blocks to sensor devices or to set configure sensor devices. If the TX/RX Slot 460A is not active, hub device 12 may allocate time for TX/RX Slot 460A to Wi-Fi™ to increase time for Wi-Fi™ communication.

Status slot 450B may share a status with some or all of sensor devices 14. Status slot 450B may not be active at every instance of a superframe. Status slot 450B may include data that is unicast, broadcast, or groupcast depending on a type of request. This mode of communication may be indicated in beacon A slot 450.

Repeater slot 460C may be configured for sending and receiving data from repeaters of a large/small data. An access point (e.g., hub device 12) may be able to send any data to any repeater using repeater slot 460C. Data included in repeater slot 460C can be unicast, broadcast or groupcast depending on a type of request. This mode of communication may be indicated in beacon A slot 450.

Twin beacon slot 460D may be called information beacon/twin beacon. Payload of twin beacon 460D may be almost same as beacon slot 450A with some exceptions but may operate in a different channel referred to herein as an information channel. Twin beacon slot 460D may be present in all superframes irrespective of modes of operation. Twin beacon slot 460D may be used by all the end devices to synchronize to the coordinator only if they lose connection with an access point using beacon slot 450A. Twin beacon slot 460D may not be used for synchronization of time but may be used to share the information like what is the operation channel or frequency hopping sequence or a next channel of communication. The duration of twin beacon slot 460D may be 5 ms. In some examples, the timing of twin beacon slot 460D may be less than 5 ms or more than 5 ms.

Dynamic BLUETOOTH slot 462 may be dedicated to BLUETOOTH by an access Point (e.g., hub device 12). Dynamic BLUETOOTH slot 462 may support mobile and sensor communication. Allocation of dynamic BLUETOOTH slot 462 may vary with different modes of comfort/security superframes as described further below. As shown, dynamic BLUETOOTH slot 462 may be 101 ms. In some examples, the timing of dynamic BLUETOOTH slot 462 may be less than 101 ms or more than 101 ms.

Figure 5:
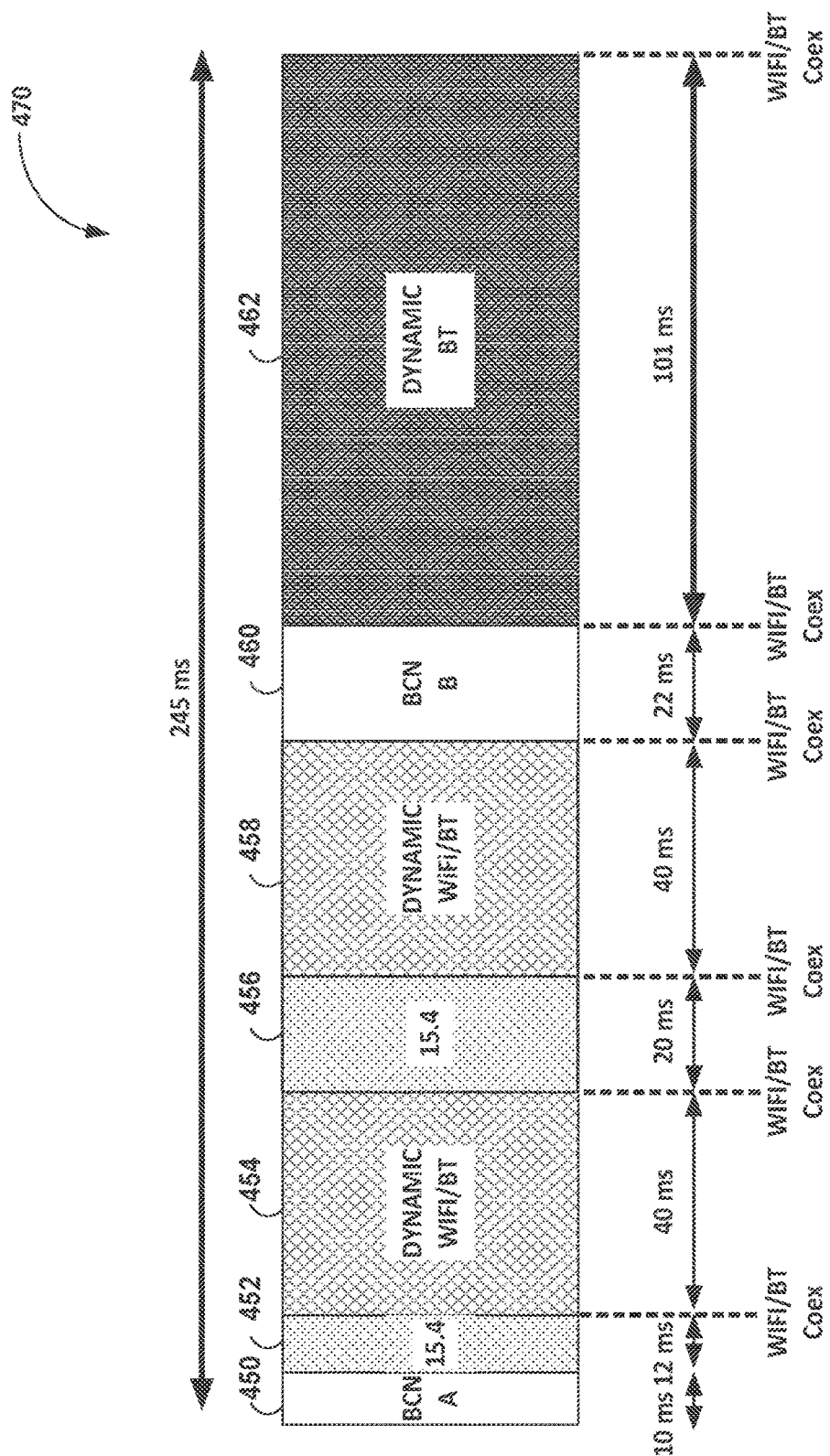
FIG. 5 is a conceptual block diagram of an example first superframe mode, in accordance with some examples of this disclosure.

FIG. 5 is a conceptual block diagram of an example first superframe mode, in accordance with some examples of this disclosure. The superframe 470 may be configured in a comfort superframe mode. In some examples, superframe 470 may be configured to support up to 64 devices and support each 802.15.4 device (e.g., an alarm) with slots of 4 ms. In the example of FIG. 5, the comfort superframe mode allocates 15.4 slots 452 and 456 to IEEE 802.15.4, dynamic Wi-Fi™ BLUETOOTH slot 454, 458 to Wi-FI™, and dynamic BLUETOOTH slot 462 to BLUETOOTH.

Figure 6:
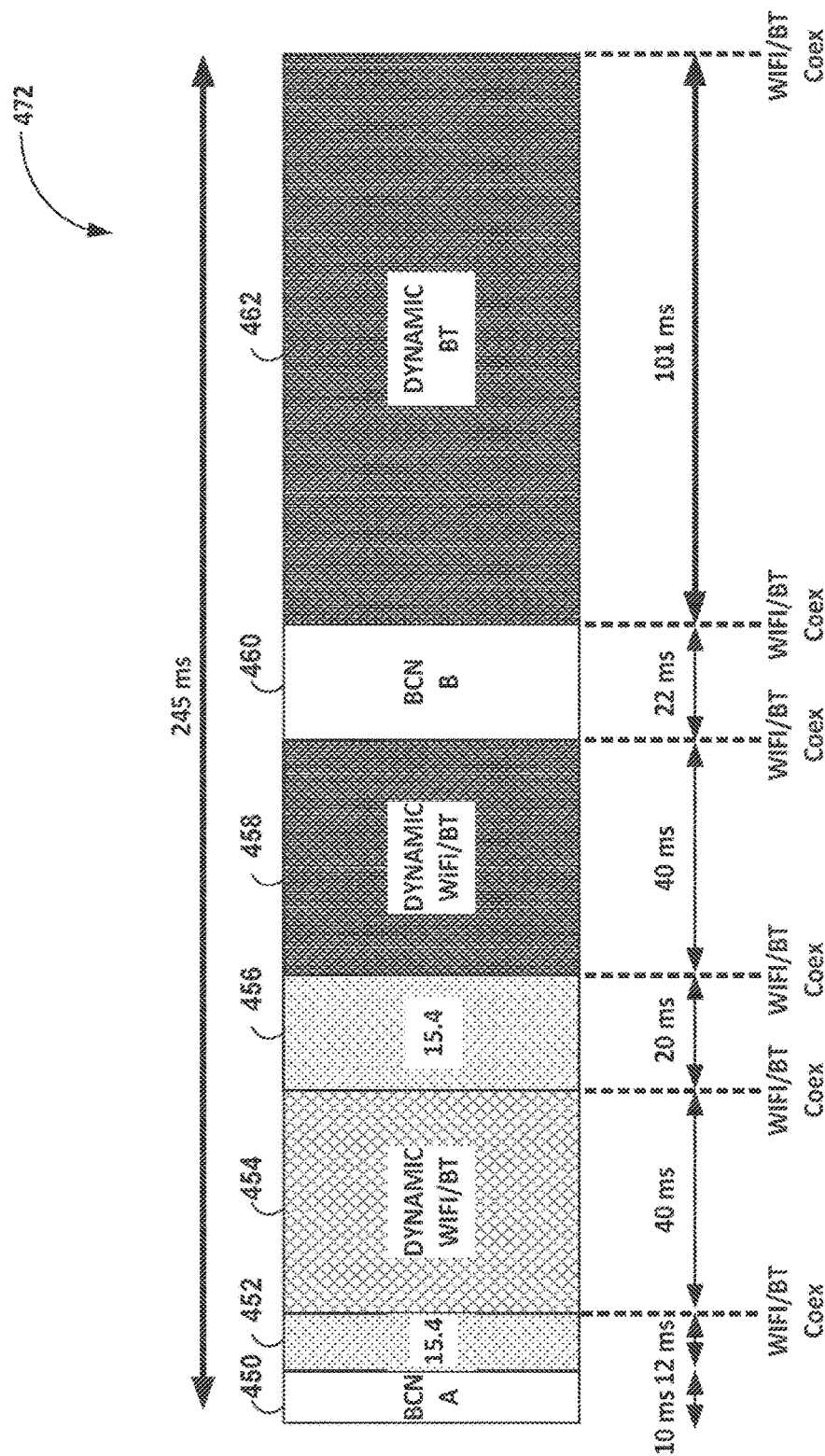
FIG. 6 is a conceptual block diagram of an example second superframe mode, in accordance with some examples of this disclosure.

FIG. 6 is a conceptual block diagram of an example second superframe mode, in accordance with some examples of this disclosure. The superframe 472 may be configured in a BLUETOOTH high bandwidth superframe mode. In this example, superframe 472 configured in a BLUETOOTH high bandwidth superframe mode may allocate an extra 40 ms time slot from Wi-Fi™ to BLUETOOTH using dynamic Wi-Fi™ BLUETOOTH slot 454 such that more time is given to BLUETOOTH for sending high bandwidth date (e.g., video/audio data) to improve bandwidth of BLUETOOTH. There may be no effect on IEEE 802.15.4. As shown, BLUETOOTH high bandwidth superframe mode allocates 15.4 slots 452 and 456 to IEEE 802.15.4, dynamic Wi-Fi™ BLUETOOTH slot 454 to Wi-FI™ dynamic Wi-Fi™ BLUETOOTH slot 454 to BLUETOOTH, and dynamic BLUETOOTH slot 462 may to BLUETOOTH. In some examples, hub device 12 may be configured to use superframe 472 configured for BLUETOOTH high bandwidth superframe mode for a maximum of 10 seconds.

For example, processing circuitry 15 of FIG. 1 may be configured to output superframe 470 configured for the comfort superframe mode of FIG. 5. In this example, processing circuitry 15 may determine a change in bandwidth in response to determining a device of sensor devices 14 is to output video and/or audio content using a third protocol (e.g., BLUETOOTH). In response to determining the change in bandwidth, processing circuitry 15 may select superframe 472 configured in a BLUETOOTH high bandwidth superframe mode. In this example, superframe 470 may allocate a dynamic slot (e.g., dynamic Wi-Fi™ BLUETOOTH slot 458) to a first protocol (e.g., Wi-Fi™) and superframe 472 allocates the dynamic slot (e.g., dynamic Wi-Fi™ BLUETOOTH slot 458) to a third protocol (e.g., BLUETOOTH). Superframe 470 may allocate more bandwidth to the first protocol (e.g., Wi-Fi™) than the second protocol (e.g., IEEE 802.15.4). In this example, superframe 472 may allocate more bandwidth to the second protocol (e.g., IEEE 802.15.4) than the first protocol (e.g., Wi-Fi™).

Figure 7:
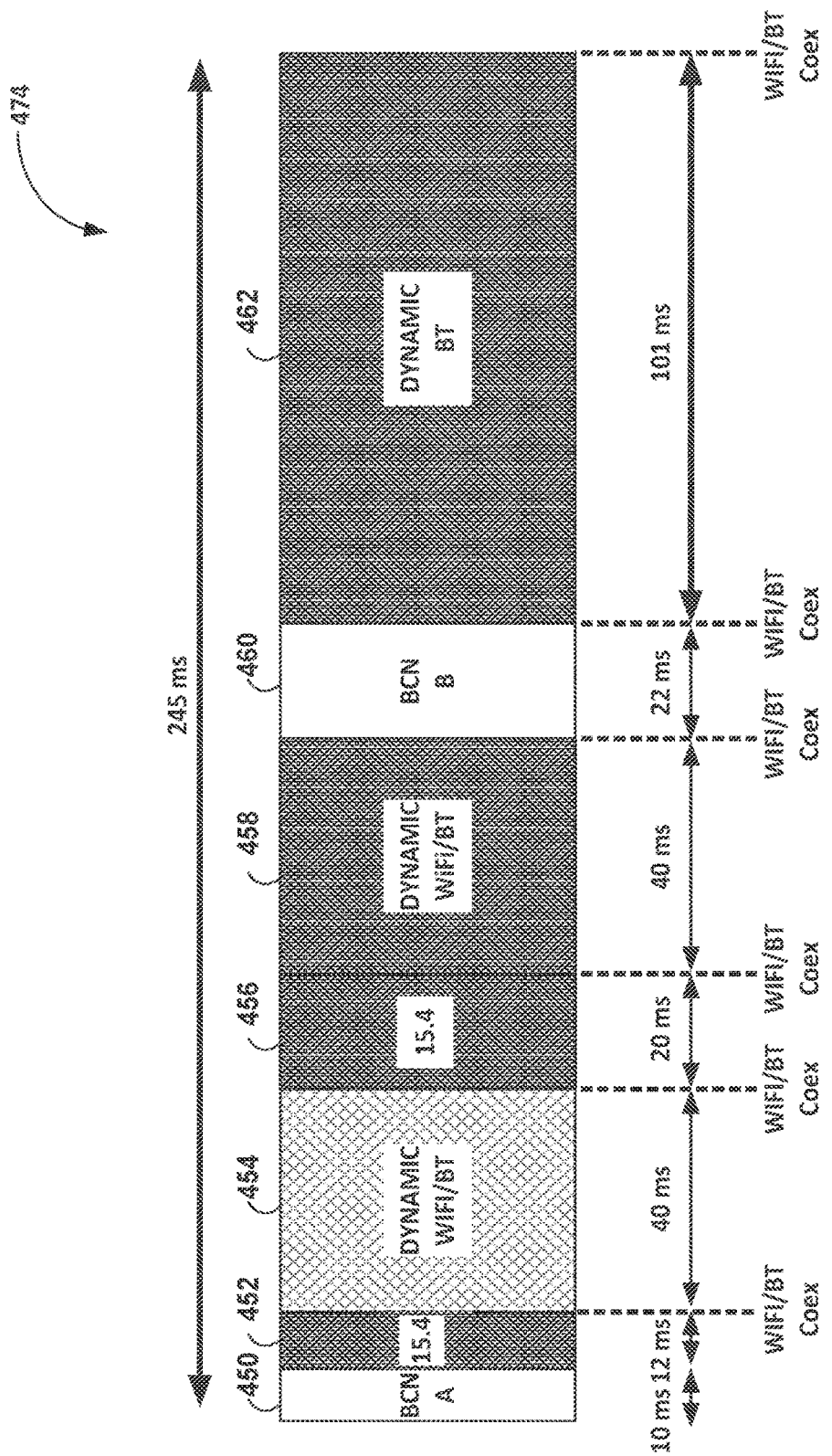
FIG. 7 is a conceptual block diagram of an example third superframe mode, in accordance with some examples of this disclosure.

FIG. 7 is a conceptual block diagram of an example third superframe mode, in accordance with some examples of this disclosure. The superframe 474 may be configured in a comfort mutually exclusive BLUETOOTH pairing superframe mode. The comfort mutually exclusive BLUETOOTH pairing superframe mode may allocate an extra 72 ms (12 ms+20 ms+40 ms) from Wi-Fi™ and 15.4 to BLUETOOTH using dynamic Wi-Fi™ BLUETOOTH slot 454 and 15.4 slots 452 and 456 such that more time is given to BLUETOOTH during pairing to improve success rate of BLUETOOTH pairing. This superframe mode may be referred to herein as "Mutually Exclusive" because 15.4 sensor reception slots are not active along with BLUETOOTH. Only BLUETOOTH is active for most of the time. As shown, comfort mutually exclusive BLUETOOTH pairing superframe mode allocates 15.4 slots 452 and 456 to BLUETOOTH, dynamic Wi-Fi™ BLUETOOTH slot 454 to Wi-FI™, dynamic Wi-Fi™ BLUETOOTH slot 458 to BLUETOOTH, and dynamic BLUETOOTH slot 462 may to BLUETOOTH. In some examples, hub device 12 may be configured to use superframe 474 configured for comfort mutually exclusive BLUETOOTH pairing superframe mode for a maximum of 3 to 4 seconds (e.g., 12 superframes, 204 ms per superframe).

For example, processing circuitry 15 of FIG. 1 may be configured to output superframe 470 configured for the comfort superframe mode of FIG. 5. In this example, processing circuitry 15 may determine a change in bandwidth in response to determining a device of sensor devices 14 is to be paired with hub device 12 using a third protocol (e.g., BLUETOOTH). In response to determining the change in bandwidth, processing circuitry 15 may select superframe 474 configured in a comfort mutually exclusive BLUETOOTH pairing superframe mode. In this example, superframe 470 allocates a dynamic slot (e.g., dynamic Wi-Fi™ BLUETOOTH slot 458) to a first protocol (e.g., Wi-Fi™) and allocates one or more second protocol slots (e.g., 15.4 slots 452 and 456) to the second protocol (e.g., IEEE 802.15.4). In this example, superframe 476 allocates the dynamic slot (e.g., dynamic Wi-Fi™ BLUETOOTH slot 458) to a third protocol (e.g., BLUETOOTH) and allocates the one or more second protocol slots (e.g., 15.4 slots 452 and 456) to the third protocol (e.g., BLUETOOTH). In this example, superframe 474 allocates no bandwidth to the second protocol (e.g., IEEE 802.15.4).

Figure 8:
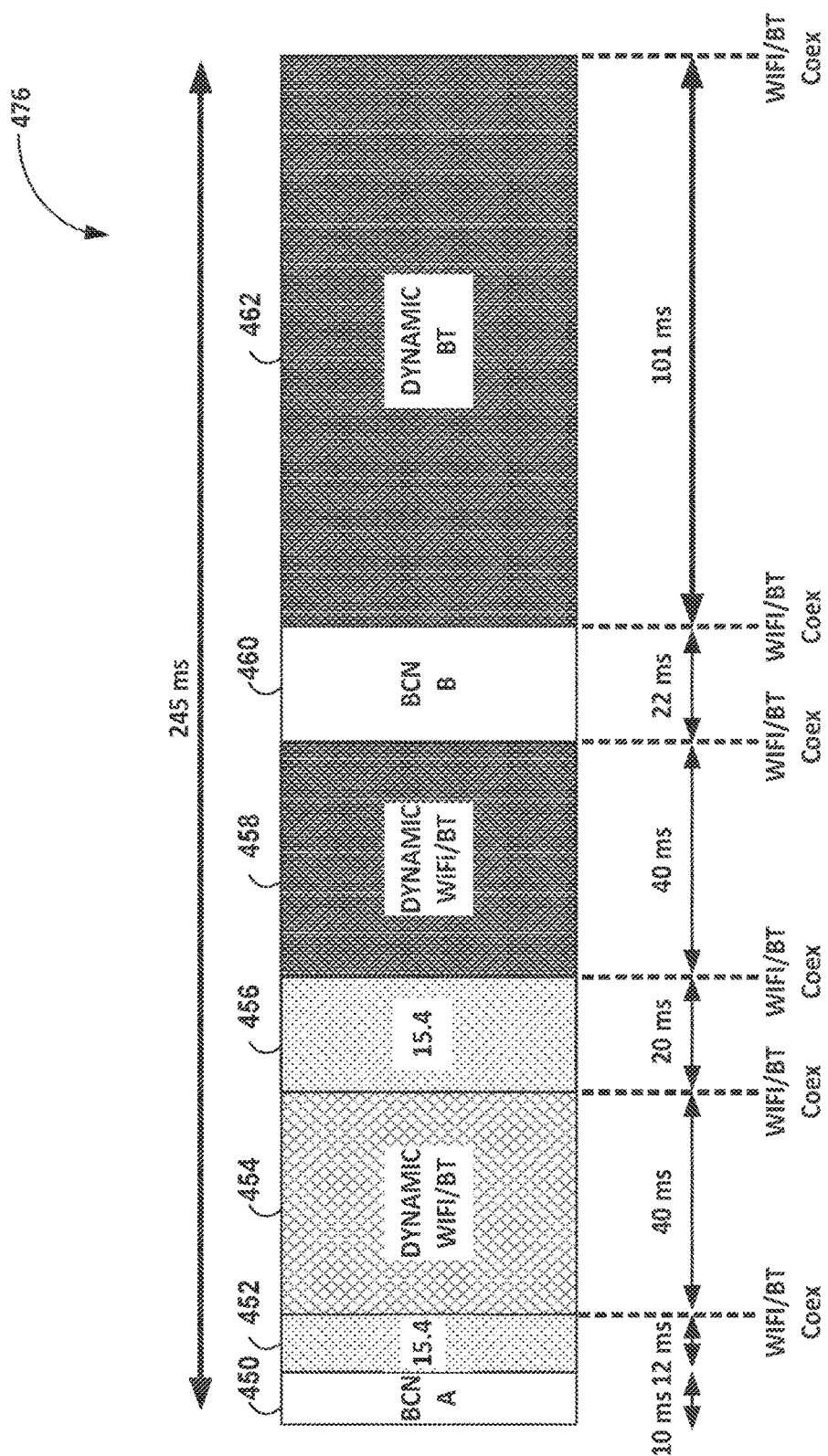
FIG. 8 is a conceptual block diagram of an example fourth superframe mode, in accordance with some examples of this disclosure.

FIG. 8 is a conceptual block diagram of an example fourth superframe mode, in accordance with some examples of this disclosure. The superframe 476 may be configured in a comfort non-mutually exclusive BLUETOOTH pairing superframe mode. The comfort non-mutually exclusive BLUETOOTH pairing superframe mode may allocate an extra 40 ms from Wi-Fi™ to BLUETOOTH using dynamic Wi-Fi™ BLUETOOTH slot 454 such that more time is given to BLUETOOTH during pairing to improve success rate of BLUETOOTH pairing. This superframe mode may be referred to herein "non-Mutually Exclusive" because 15.4 sensor reception slots are active along with BLUETOOTH. As shown, comfort mutually exclusive BLU- ETOOTH pairing superframe mode allocates 15.4 slots 452 and 456 to IEEE 802.15.4, dynamic Wi-Fi™ BLUETOOTH slot 454 to Wi-FI™ dynamic Wi-Fi™ BLUETOOTH slot 454 to BLUETOOTH, and dynamic BLUETOOTH slot 462 may to BLUETOOTH. In some examples, hub device 12 may be configured to use superframe 476 configured for comfort non-mutually exclusive BLUETOOTH pairing superframe mode for a maximum of 3 to 4 seconds (e.g., 12 superframes, 204 ms per superframe).

For example, processing circuitry 15 of FIG. 1 may be configured to output superframe 470 configured for the comfort superframe mode of FIG. 5. In this example, processing circuitry 15 may determine a change in bandwidth in response to determining a device of sensor devices 14 is to be paired with hub device 12 using a third protocol (e.g., BLUETOOTH). In response to determining the change in bandwidth, processing circuitry 15 may select superframe 476 configured in a BLUETOOTH high bandwidth superframe mode. In this example, superframe 470 allocates a dynamic slot (e.g., dynamic Wi-Fi™ BLUETOOTH slot 458) to a first protocol (e.g., Wi-Fi™) and superframe 476 allocates the dynamic slot (e.g., dynamic Wi-Fi™ BLUETOOTH slot 458) to a third protocol (e.g., BLUETOOTH). Superframe 470 may allocate more bandwidth to the first protocol (e.g., Wi-Fi™) than the second protocol (e.g., IEEE 802.15.4). In this example, superframe 476 allocates more bandwidth to the second protocol (e.g., IEEE 802.15.4) than the first protocol (e.g., Wi-Fi™).

Figure 9:
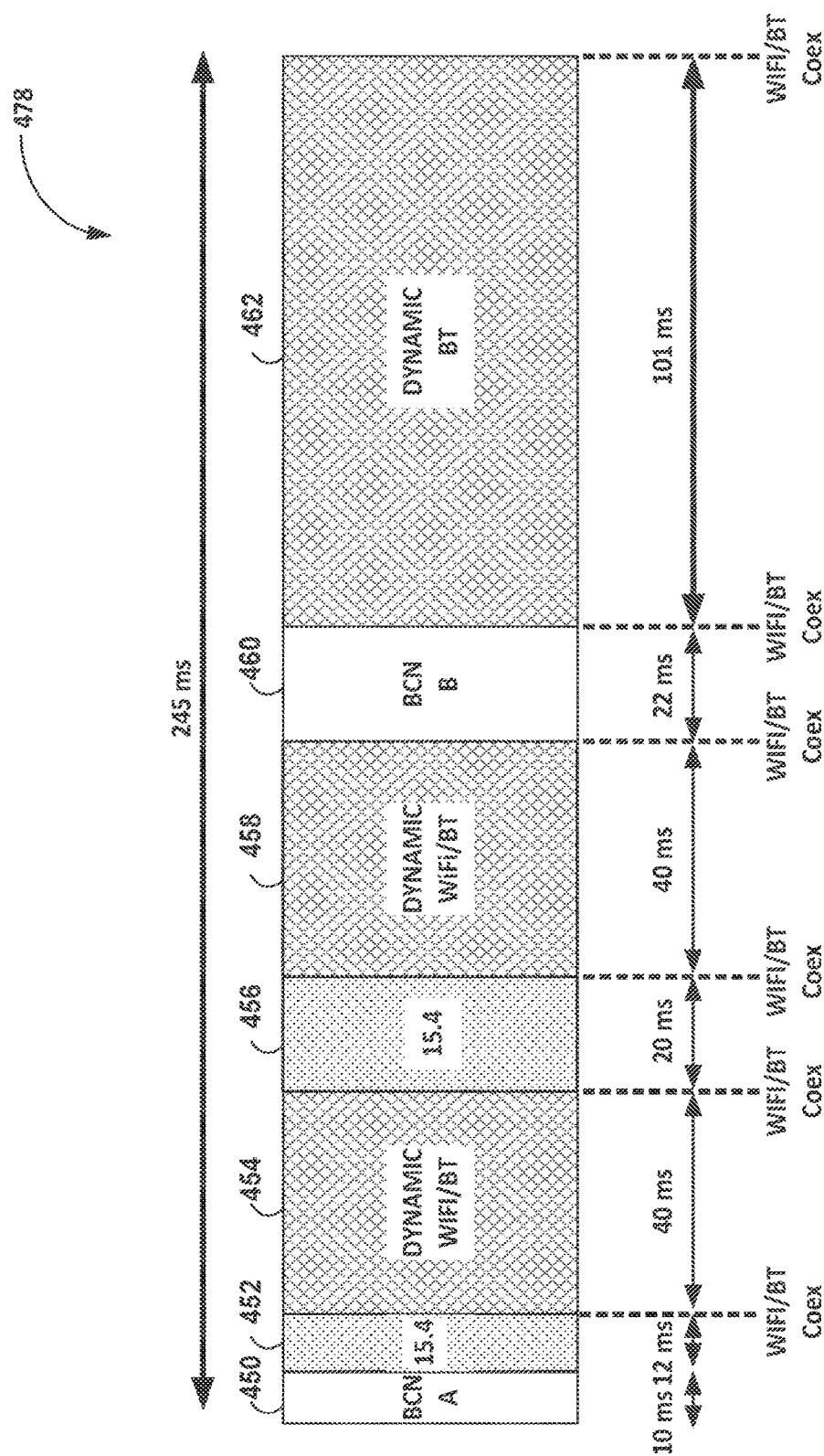
FIG. 9 is a conceptual block diagram of an example fifth superframe mode, in accordance with some examples of this disclosure.

FIG. 9 is a conceptual block diagram of an example fifth superframe mode, in accordance with some examples of this disclosure. The superframe 478 may be configured in a Wi-Fi™ High Bandwidth superframe mode. The Wi-Fi™ High Bandwidth superframe mode may allocate an extra 101 ms from BLUETOOTH. Hub device 12 may use superframe 478 configured in Wi-Fi™ High Bandwidth superframe mode to accommodate a large Wi-Fi™ data exchange. For example, hub device 12 may use superframe 478 configured in Wi-Fi™ High Bandwidth superframe mode to accommodate a firmware upgrade to get latest system image from a cloud server and that more critical than BLUETOOTH communication. As shown, Wi-Fi™ High Bandwidth superframe mode allocates 15.4 slots 452 and 456 to IEEE 802.15.4, dynamic Wi-Fi™ BLUETOOTH slots 454, 458 to Wi-FI™, and dynamic BLUETOOTH slot 462 may to Wi-FI™.

For example, processing circuitry 15 of FIG. 1 may be configured to output superframe 470 configured for the comfort superframe mode of FIG. 5. In this example, processing circuitry 15 may determine a change in bandwidth in response to a data transmission using the first protocol (e.g., Wi-Fi™) exceeds a threshold (e.g., a preconfigured threshold, predetermined threshold, etc.). In response to determining the change in bandwidth, processing circuitry 15 may select superframe 478 configured in a Wi-Fi™ High Bandwidth superframe mode. In this example, superframe 470 allocates a third protocol slot (e.g., dynamic BLUETOOTH slot 462) to the third protocol (e.g., BLUETOOTH) and superframe 478 allocates the third protocol slot (e.g., dynamic BLUETOOTH slot 462) to the first protocol (e.g., Wi-Fi™). Superframe 470 may allocate more bandwidth to the third protocol (e.g., BLUETOOTH) than the first protocol (e.g., Wi-Fi™) and superframe 478 may allocate more bandwidth to the third protocol than the second protocol. In this example, superframe 470 may allocate less bandwidth to the third protocol than the first protocol and superframe 478 may allocate less bandwidth to the third protocol than the second protocol.

TABLE 1

| Modes of Operation | BT (Percentage) | 802.15.4 (Percentage) | Wi-Fi (Percentage) | Theoretical Kbps (Kilo Bits per Second) |
|---|---|---|---|---|
| BT Normal Mode (e g., FIG. 5) | 40.8% (100 ms) | 26% (64 ms) | 32% (80 ms) | BT (1 Mbps) - 400 kbps/200 kbps BT (2 Mbps) - 800 kbps/400 kbps Wi-FI ™ (11 Mbps) -3.5 Mbps/1.7 Mbps |
| High BT Bandwidth Mode (e g., FIG. 6) | 53% (146 ms) | 23% (58 ms) | 16% (40 ms) | BT(1 Mbps) - 584 kbps/292 kbps BT(2 Mbps) - 1168 kbps/584 kbps Wi-FI ™ (11 Mbps)- 0.5 Mbps/0.25 Mbps |
| BT Paring Mode -1 Mutually Exclusive BT Pairing (e g., FIG. 7) | 77% (189 ms) | 8.5% (21 ms) | 16% (40 ms) | BT (1 Mbps)- 756 kbs/378 kbps BT (2 Mbps)- 1512 kbps/756 kbps Wi-FI ™ (11 Mbps)- 0.5 Mbps/0.25 Mbps |
| BT Paring Mode -2 NOT Mutually Exclusive BT Pairing (e g., FIG. 8) | 53% (146 ms) | 23% (58 ms) | 16% (40 ms) | BT(1 Mbps) - 584 kbps/292 kbps BT(2 Mbps) - 1168 kbps/5 84 kbps Wi-FI ™ (11 Mbps)- 0.5 Mbps/0.25 Mbps |
| High Wi-FI ™ Bandwidth Mode (e g., FIG. 9) | 0% | 26% (64 ms) | 73% (180 ms) | BT(1 Mbps) - 0 BT(2 Mbps) - 0 Wi-FI ™ (11 Mbps)- 7.9 Mbps/3.8 Mbps |

Table 1 illustrates bandwidth allocation for the examples of FIGS. 5-9.

Figure 10:
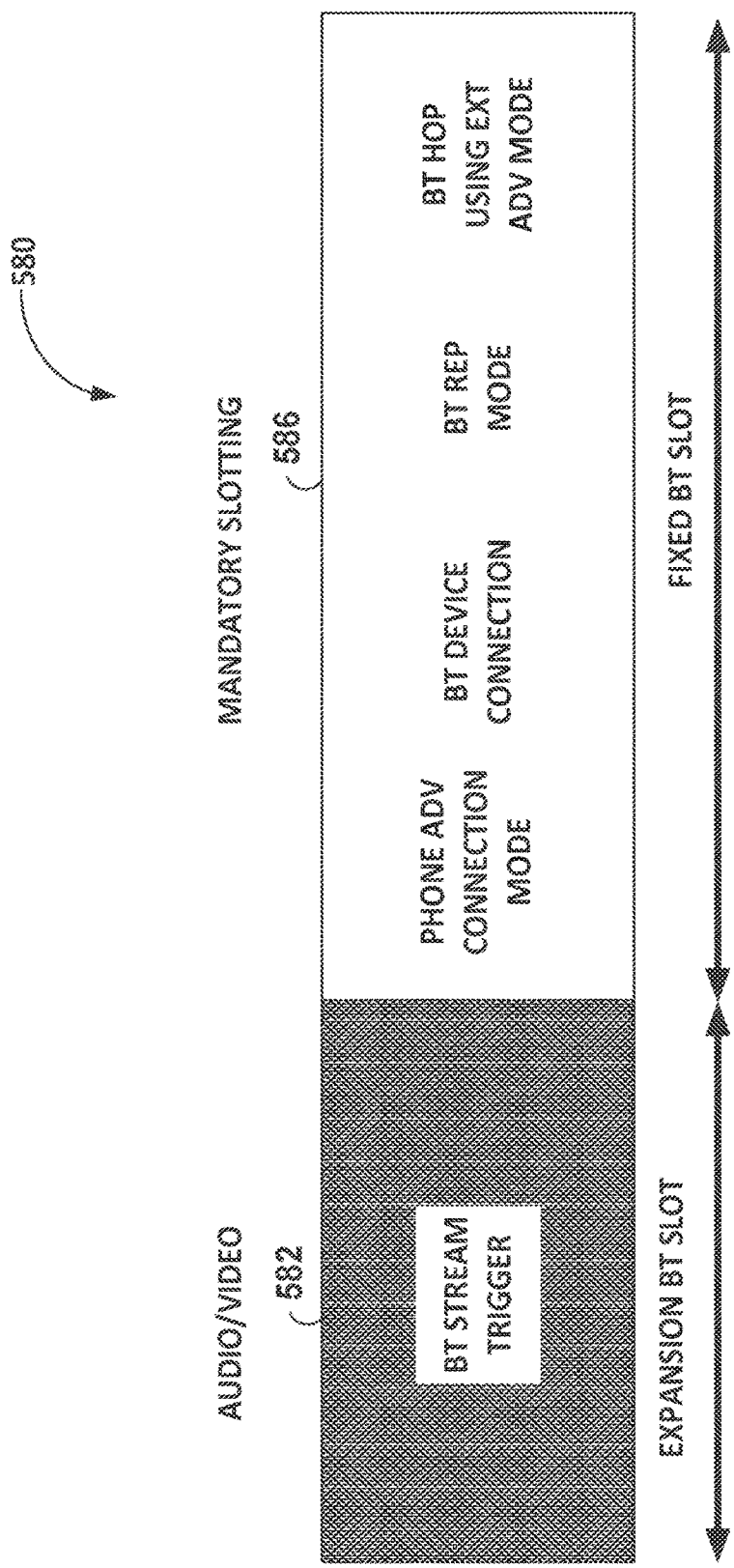
FIG. 10 is a conceptual block diagram of an expansion slot for a superframe mode, in accordance with some examples of this disclosure.

FIG. 10 is a conceptual block diagram of an expansion slot 582 for a superframe mode, in accordance with some examples of this disclosure. In this example, BLUETOOTH slots of superframe 580 may be synchronized from 15.4 Beacons. At 144 ms from a 15.4 Beacon, a BLUETOOTH slot may start and end just before a next beacon slot. BLUETOOTH slotting may include a fixed BLUETOOTH slot 586 and an expansion BLUETOOTH slot 582.

Fixed BLUETOOTH slot 586 (e.g., 101 ms width) may be allocated to every superframe for BLUETOOTH. Fixed BLUETOOTH slot 586 may be used for a connection event, data exchange, mobile communication, BLUETOOTH repeater mode communication, comfort system to security system communication using extended advertisement mode, or another process. Different combination of a connection event time out, supervision time out may allow performing multiple activities across multiple superframe. In this way, a system (e.g., system 10, 20, 30, etc.) may be configured to address a maximum of 6 peripherals, 2 mobile devices, and one different system communication through BLUETOOTH.

Expansion BLUETOOTH Slot 582 (e.g., 40 ms width) may be added into BLUETOOTH communication only when high data transmission to be done, such as, for example, audio/video transmission. Once a sensor device (e.g., sensor devices 14) recognizes expansion BLUETOOTH slot 582, the sensor device will start sending audio/video using expansion BLUETOOTH slot 582.

Figure 11:
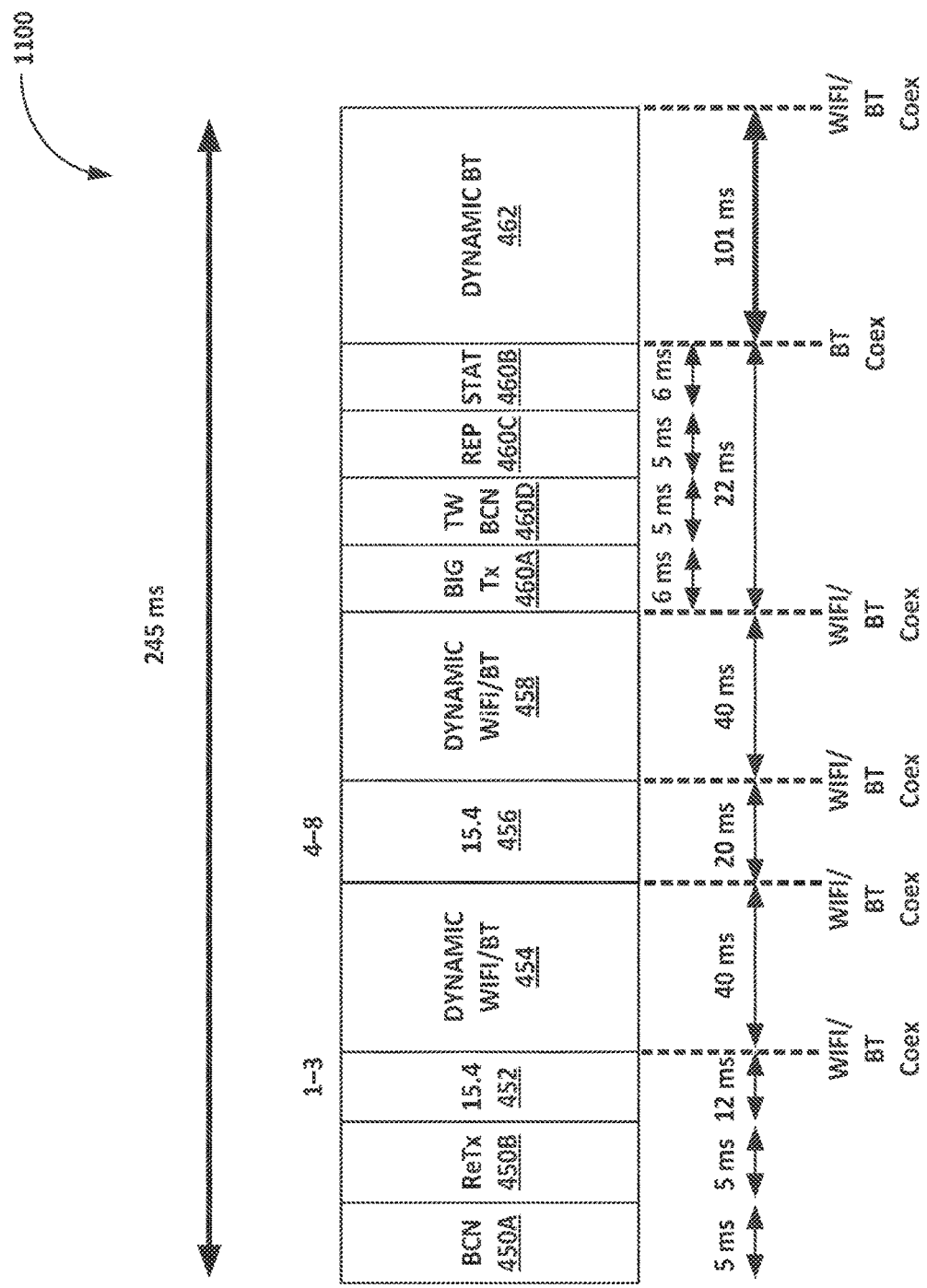
FIG. 11 is a conceptual block diagram of a second example of slots for superframe modes, in accordance with some examples of this disclosure.

FIG. 11 is a conceptual block diagram of a second example of slots for superframe modes, in accordance with some examples of this disclosure. In this example, superframe 1100 is configured in a superframe mode where big TX/RX Slot 460A ("Big Tx 460A") is arranged at a beginning of beacon slot B 460, followed by twin beacon slot 460D, which is followed by repeater slot 460C, which is followed by status slot 460B. The order of slots shown in FIG. 11 is for example purposes only. Timing shown in FIG. 11 is for example purposes only. For example, superframe 1100 may be shorter than 245 ms or longer than 245 ms.

Figure 12:
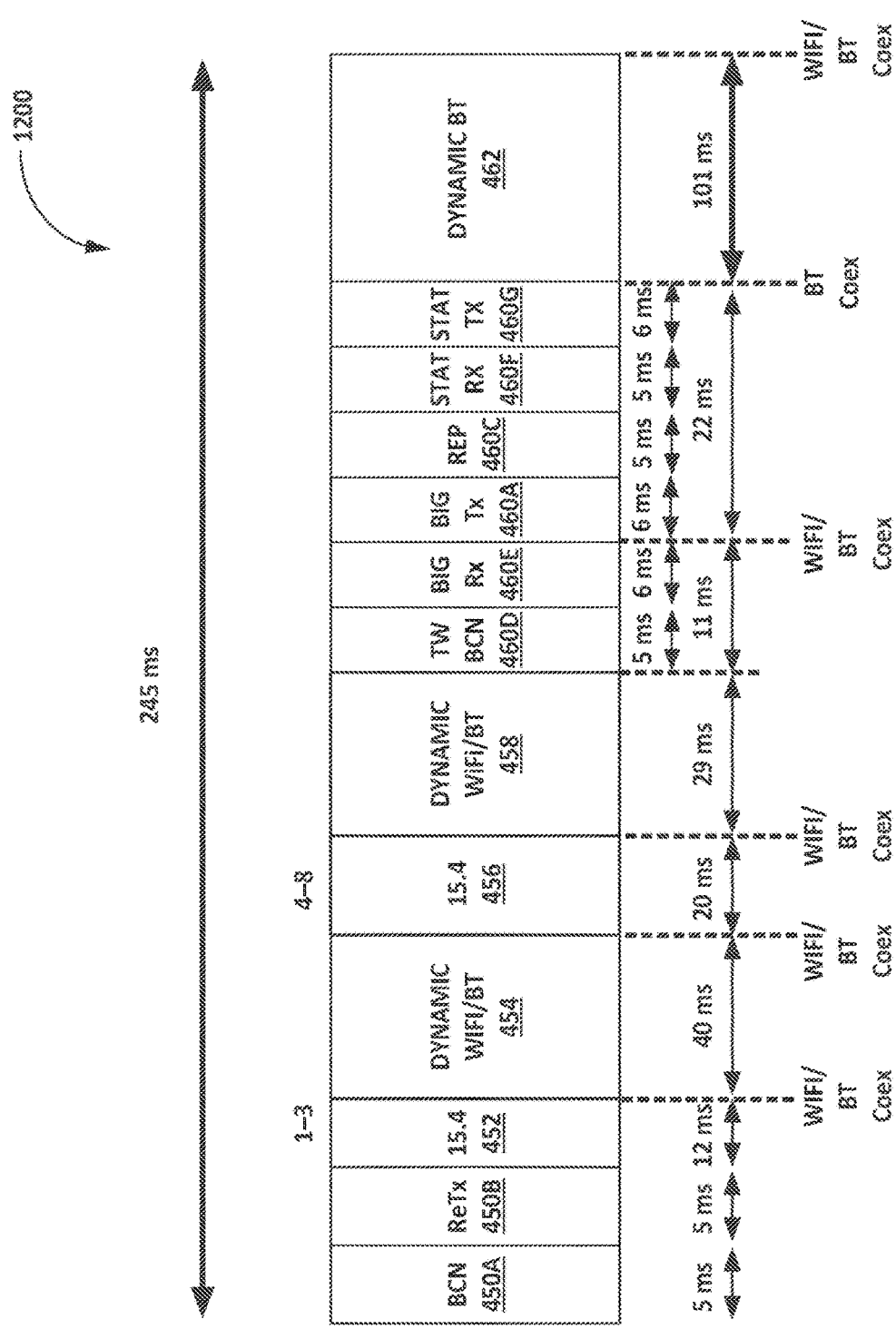
FIG. 12 is a conceptual block diagram of a third example of slots for superframe modes, in accordance with some examples of this disclosure.

FIG. 12 is a conceptual block diagram of a third example of slots for superframe modes, in accordance with some examples of this disclosure. In this example, superframe 1200 is configured in a superframe mode where twin beacon slot 460D is arranged at a beginning of beacon slot B 460, followed by big TX/RX Slot 460A (which is split into big Rx slot 460E and big Tx slot 460A), which is followed by repeater slot 460C, which is followed by status slot 460B (which is split into status Rx slot 460F and status Tx slot 460G). The order of slots shown in FIG. 12 is for example purposes only. Timing shown in FIG. 12 is for example purposes only. For example, superframe 1200 may be shorter than 245 ms or longer than 245 ms.

Figure 13:
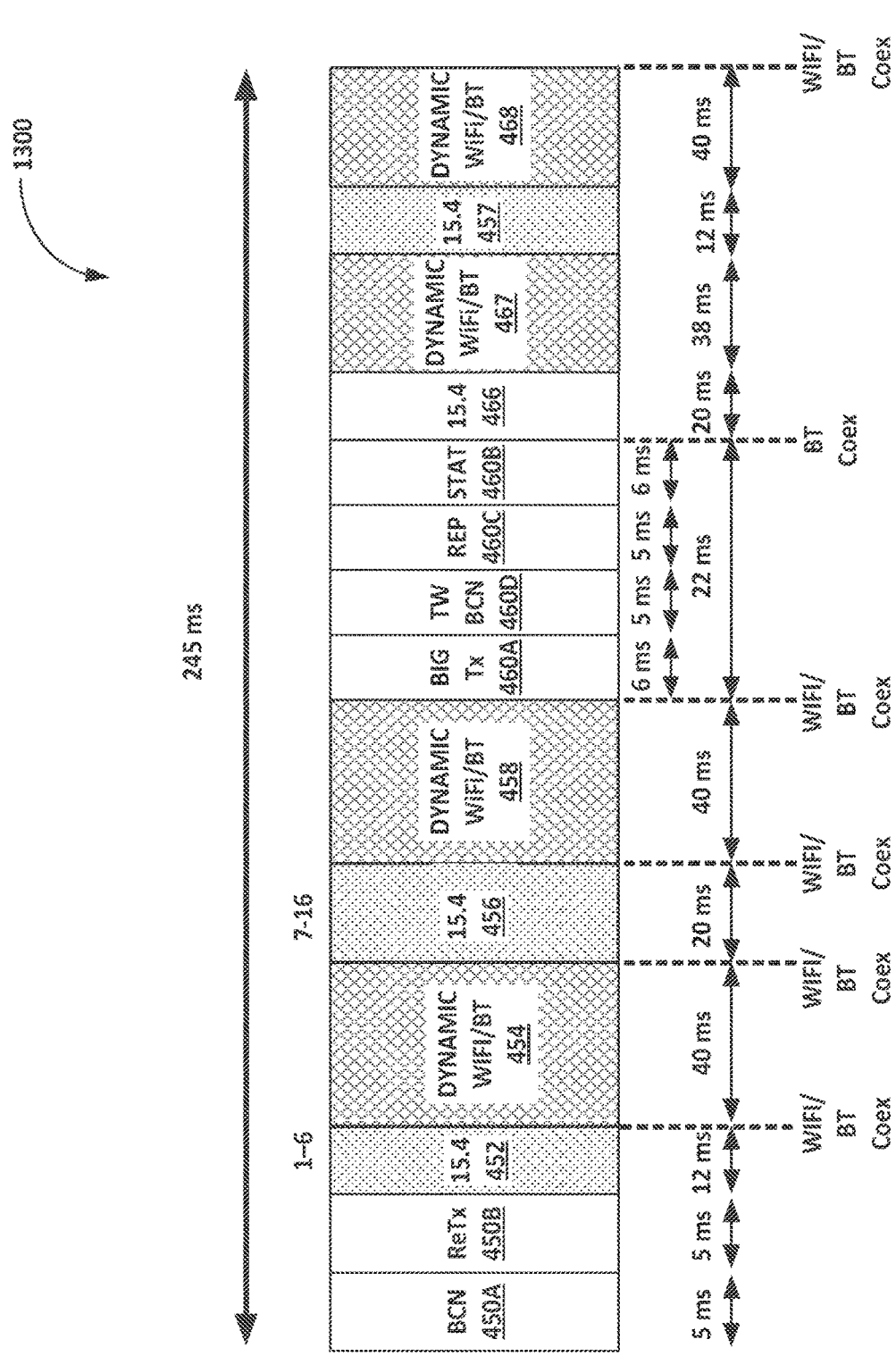
FIG. 13 is a conceptual block diagram of an example sixth superframe mode, in accordance with some examples of this disclosure.

FIG. 13 is a conceptual block diagram of an example sixth superframe mode, in accordance with some examples of this disclosure. The superframe 1300 may be configured in a normal security superframe mode. In this example, superframe 1300 configured in a normal security superframe mode that allocate Wi-Fi™, BLUETOOTH, and IEEE 802.15.4 to support up to 128 devices and alarms slots are as small as 2 ms. As shown, normal security superframe mode allocates 15.4 slots 452, 456, and 457 to IEEE 802.15.4, dynamic Wi-Fi™ BLUETOOTH slot 454, 458 to Wi-FI™, and dynamic BLUETOOTH slots 467, 468 to Wi-FI™.

In some examples, hub device 12 may be configured for a security OFF chip BLUETOOTH pairing mode. In this mode, BLUETOOTH and IEEE 802.15.4 may be on different chips and Wi-Fi™ may be implemented on an external chip. During BLUETOOTH pairing mode, hub device 12 may allocate Wi-Fi™ slots to BLUETOOTH through a general-purpose input/output (GPIO) interface indicating through co-existence lines.

For example, processing circuitry 15 of FIG. 1 may be configured to output superframe 470 configured for the comfort superframe mode of FIG. 5. In this example, processing circuitry 15 may determine a change in bandwidth in response to an enrollment of an alarm system including more than 64 devices. In response to determining the change in bandwidth, processing circuitry 15 may select superframe 1300 configured in a normal security superframe mode. In this example, superframe 470 may allocate a dynamic slot (e.g., dynamic BLUETOOTH slot 462) to the third protocol (e.g., BLUETOOTH). In this example, superframe 1300 may split the dynamic slot into a first sub-slot (e.g., dynamic BLUETOOTH slots 467 and/or dynamic BLUETOOTH slots 468) allocated to the first protocol (e.g., Wi-Fi™) and a second sub-slot (e.g., 15.4 slot 457) allocated to the second protocol.

Figure 14:
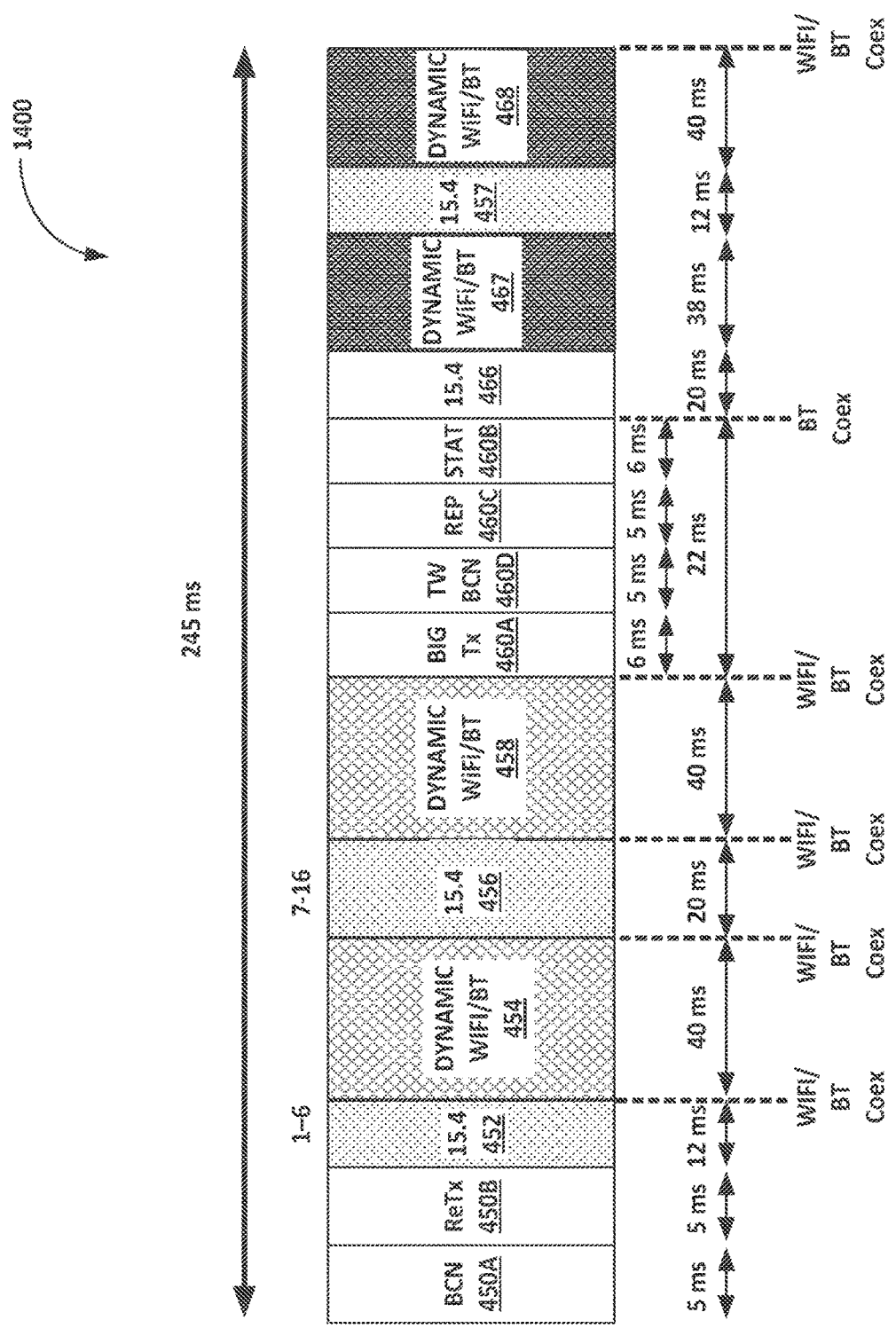
FIG. 14 is a conceptual block diagram of an example seventh superframe mode, in accordance with some examples of this disclosure.

FIG. 14 is a conceptual block diagram of an example seventh superframe mode, in accordance with some examples of this disclosure. In this example, superframe 1400 configured in a security ON chip Bluetooth pairing superframe mode that allocate Wi-Fi™ BLUETOOTH, and IEEE 802.15.4 to support up to 128 devices and alarms slots are as small as 2 ms. As shown, security ON chip Bluetooth pairing superframe mode allocates 15.4 slots 452, 456, and 457 to IEEE 802.15.4, dynamic Wi-Fi™ BLUETOOTH slot 454, 458 to Wi-FI™, and dynamic BLUETOOTH slots 467, 468 to BLUETOOTH.

For example, processing circuitry 15 of FIG. 1 may be configured to output superframe 470 configured for the comfort superframe mode of FIG. 5. In this example, processing circuitry 15 may determine a change in bandwidth in response to an enrollment of an alarm system including more than 64 devices and BLUETOOTH pairing. In response to determining the change in bandwidth, processing circuitry 15 may select superframe 1400 configured in a security ON chip Bluetooth pairing superframe mode. In this example, superframe 470 may allocate a dynamic slot (e.g., dynamic BLUETOOTH slot 462) to the third protocol (e.g., BLUETOOTH). In this example, superframe 1400 may split the dynamic slot into a first sub-slot (e.g., dynamic BLUETOOTH slots 467 and/or dynamic BLUETOOTH slots 468) allocated to the third protocol (e.g., BLUETOOTH) and a second sub-slot (e.g., 15.4 slot 457) allocated to the second protocol (e.g., IEEE 802.15.4).

Figure 15:
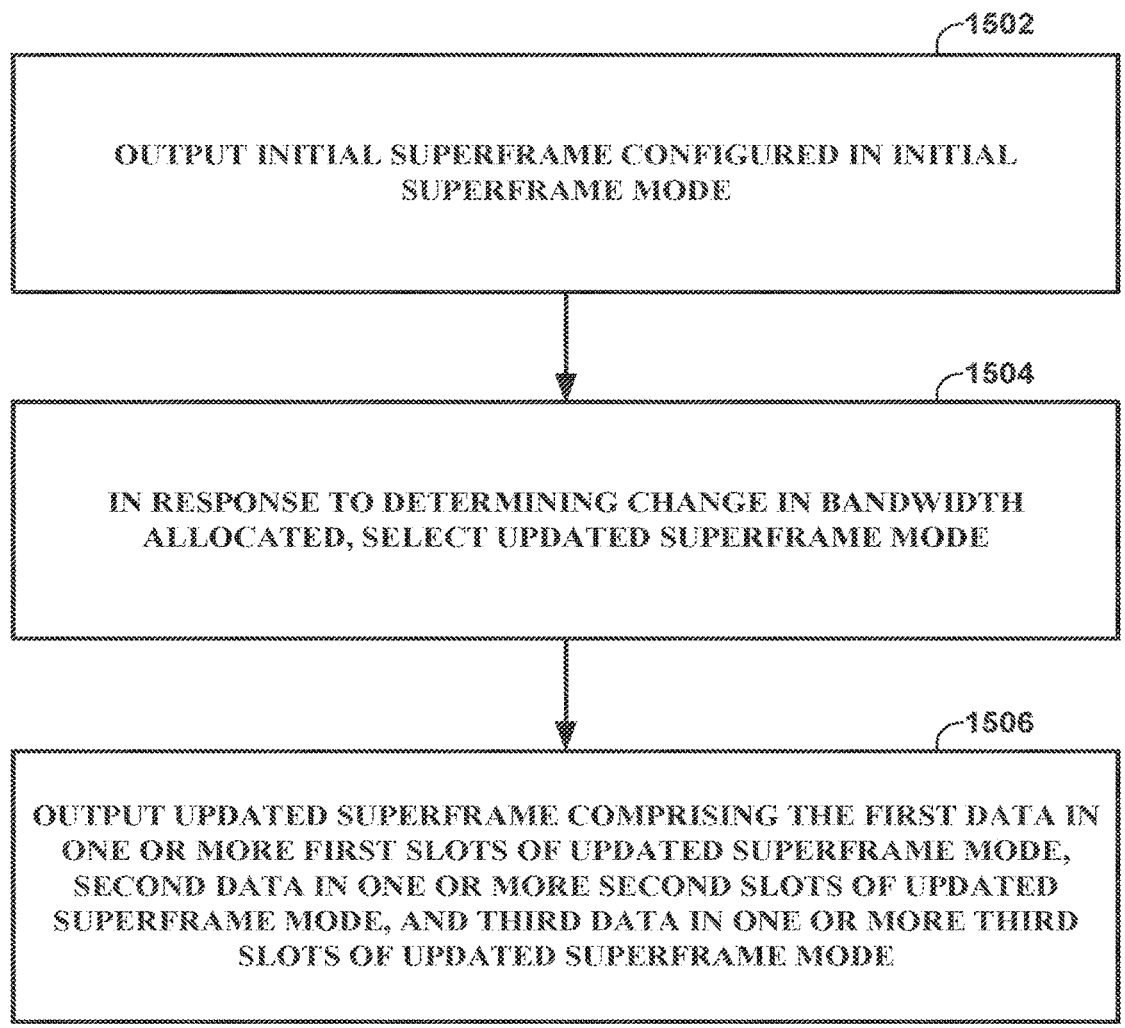
FIG. 15 is a flowchart illustrating example techniques for wirelessly connecting devices using TDMA, in accordance with some examples of this disclosure.

FIG. 15 is a flowchart illustrating example techniques for wirelessly connecting devices using TDMA, in accordance with some examples of this disclosure. The examples of FIGS. 1A, 1B, and 2-14 are referred to for example purposes only.

In accordance with the techniques of the disclosure, processing circuitry 15 may output, to a sensor devices 14, an initial superframe 16 configured in an initial superframe mode of a plurality of superframe modes (1502). In some examples, each superframe mode of the plurality of superframe modes allocates each slot of a plurality of slots for wireless communication to a first protocol, a second protocol, or a third protocol, the first protocol, the second protocol, and the third protocol being different from each other.

The first protocol may include Wi-Fi™, the second protocol may include IEEE 802.15.4, and the third protocol may include BLUETOOTH.

In response to determining a change in bandwidth allocated to one or more of the first protocol, the second protocol, or the third protocol, processing circuitry 15 may select an updated superframe mode from the plurality of superframe modes that is different from the initial superframe mode (1504). Processing circuitry 15 may output, to sensor devices 14, an updated superframe configured in the updated superframe mode (1506).

The following numbered examples demonstrate one or more aspects of the disclosure.

Example 1. An apparatus for communication with a plurality of devices using time divisional multiple access (TDMA), the apparatus comprising processing circuitry configured to: output, to the plurality of devices, an initial superframe configured in an initial superframe mode of a plurality of superframe modes, each superframe mode of the plurality of superframe modes allocating each slot of a plurality of slots for wireless communication to a first protocol, a second protocol, or a third protocol, wherein the first protocol, the second protocol, and the third protocol are different from each other; in response to determining a change in bandwidth allocated to one or more of the first protocol, the second protocol, or the third protocol, select an updated superframe mode from the plurality of superframe modes that is different from the initial superframe mode; and output, to the plurality of devices, an updated superframe configured in the updated superframe mode.

Example 2. The apparatus of example 1, wherein, to output the initial superframe, the processing circuitry is configured to output a beacon indicating starting of the initial superframe and indicating a group number assigned to each device of the plurality of devices; and wherein, to output the updated superframe, the processing circuitry is configured to output a second beacon indicating starting of the updated superframe and indicating the group number assigned to each device of the plurality of devices.

Example 3. The apparatus of examples 1 or 2, wherein the initial superframe mode allocates a dynamic slot of the plurality of slots for wireless communication to the first protocol; and wherein the updated superframe allocates the dynamic slot to the third protocol.

Example 4. The apparatus of any of examples 1-3, wherein, to determine the change in bandwidth, the processing circuitry is configured to determine a device of the plurality of devices is to output video and/or audio content using the third protocol.

Example 5. The apparatus of any of examples 1-4, wherein, to determine the change in bandwidth, the processing circuitry is configured to determine a device of the plurality of devices is to be paired with the apparatus using the third protocol.

Example 6. The apparatus of any of examples 1-5, wherein the initial superframe allocates more bandwidth to the first protocol than the second protocol; and wherein the updated superframe allocates more bandwidth to the second protocol than the first protocol.

Example 7. The apparatus of any of examples 1-6, wherein the initial superframe mode allocates a dynamic slot of the plurality of slots for wireless communication to the first protocol and allocates one or more second protocol slots of the plurality of slots for wireless communication to the second protocol; and wherein the updated superframe allocates the dynamic slot to the third protocol and allocates the one or more second protocol slots to the third protocol.

Example 8. The apparatus of any of examples 1-7, wherein, to determine the change in bandwidth, the processing circuitry is configured to determine a device of the plurality of devices is to be paired with the apparatus using the third protocol.

Example 9. The apparatus of any of examples 1-8, wherein the updated superframe allocates no bandwidth to the second protocol.

Example 10. The apparatus of any of examples 1-9, wherein the initial superframe mode allocates a third protocol slot of the plurality of slots for wireless communication to the third protocol; and wherein the updated superframe allocates the third protocol slot to the first protocol.

Example 11. The apparatus of any of examples 1-10, wherein, to determine the change in bandwidth, the processing circuitry is configured to determine a data transmission using the first protocol exceeds a threshold.

Example 12. The apparatus of any of examples 1-11, wherein the initial superframe allocates more bandwidth to the third protocol than the first protocol and wherein the initial superframe allocates more bandwidth to the third protocol than the second protocol; and wherein the updated superframe allocates less bandwidth to the third protocol than the first protocol and wherein the updated superframe allocates less bandwidth to the third protocol than the second protocol.

Example 13. The apparatus of any of examples 1-12, wherein the initial superframe mode allocates a dynamic slot of the plurality of slots for wireless communication to the third protocol; and wherein the updated superframe splits the dynamic slot into a first sub-slot allocated to the first protocol and a second sub-slot allocated to the second protocol.

Example 14. The apparatus of any of examples 1-13, wherein the initial superframe mode allocates a dynamic slot of the plurality of slots for wireless communication to the third protocol; and wherein the updated superframe splits the dynamic slot into a first sub-slot allocated to the third protocol and a second sub-slot allocated to the second protocol.

Example 15. The apparatus of any of examples 1-14, wherein the first protocol includes a local area networking protocol; wherein the second protocol includes a low-power wireless connection protocol; and wherein the third protocol includes a high-bandwidth connection protocol.

Example 16. The apparatus of any of examples 1-15, wherein the first protocol includes WI-FI™; wherein the second protocol includes IEEE 802.15.4; and wherein the third protocol includes BLUETOOTH.

Example 17. The apparatus of any of examples 1-16, wherein the superframe is configured for a 2.4 GHz band.

Example 18. The apparatus of any of examples 1-17, wherein the plurality of devices comprises one or more of a thermostat, a security device, a water heater, a water flow controller, or a garage door controller.

Example 19. A method comprising: outputting, by processing circuitry, to a plurality of devices, an initial superframe configured in an initial superframe mode of a plurality of superframe modes, each superframe mode of the plurality of superframe modes allocating each slot of a plurality of slots for wireless communication to a first protocol, a second protocol, or a third protocol, the first protocol, the second protocol, and the third protocol being different from each other; in response to determining a change in bandwidth allocated to one or more of the first protocol, the second protocol, or the third protocol, selecting, by the processing circuitry, an updated superframe mode from the plurality of superframe modes that is different from the initial superframe mode; and outputting, by the processing circuitry, to the plurality of devices, an updated superframe configured in the updated superframe mode.

Example 20. A system comprising: a plurality of sensor devices; and a hub device in communication with the plurality of devices using time divisional multiple access (TDMA), the hub device comprising processing circuitry configured to: output, to the plurality of devices, an initial superframe configured in an initial superframe mode of a plurality of superframe modes, each superframe mode of the plurality of superframe modes allocating each slot of a plurality of slots for wireless communication to a first protocol, a second protocol, or a third protocol, the first protocol, the second protocol, and the third protocol being different from each other; in response to determining a change in bandwidth allocated to one or more of the first protocol, the second protocol, or the third protocol, select an updated superframe mode from the plurality of superframe modes that is different from the initial superframe mode; and output, to the plurality of devices, an updated superframe configured in the updated superframe mode.

The disclosure may be implemented using computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:
1. An apparatus comprising processing circuitry configured to:
   for each respective superframe associated with a superframe mode, dynamically allocate a slot of a plurality of slots of the respective superframe to one of at least a first protocol and a second protocol, wherein the first protocol and the second protocol are different from each other;
   select an initial superframe mode for wireless communication based on at least one of:
   a type of device of a plurality of devices using the wireless communication for communication with the apparatus; and
   an operational mode of the wireless communication;
   determine a change in bandwidth allocated to one or more of the first protocol and/or the second protocol based on a change in the operational mode of the wireless communication;
   in response to determining the change in bandwidth, select an updated superframe mode that is different from the initial superframe mode; and
   output, to the plurality of devices, a second superframe configured for the updated superframe mode.
2. The apparatus of claim 1, wherein the processing circuitry is further configured to:
   output, to the plurality of devices, a first superframe configured for the initial superframe mode, wherein, to output the first superframe, the processing circuitry is configured to output a beacon indicating starting of the first superframe and indicating a group number assigned to each device of the plurality of devices; and wherein, to output the second superframe, the processing circuitry is configured to output a second beacon indicating starting of the second superframe and indicating the group number assigned to each device of the plurality of devices.

3. The apparatus of claim 1, wherein the processing circuitry is further configured to:
output, to the plurality of devices, a first superframe configured for the initial superframe mode,
wherein the first superframe allocates a dynamic slot of the plurality of slots for wireless communication to the first protocol; and
wherein the second superframe allocates the dynamic slot to a third protocol.

4. The apparatus of claim 3, wherein, to determine the change in bandwidth, the processing circuitry is configured to determine a device of the plurality of devices is to output video and/or audio content using the third protocol.

5. The apparatus of claim 3, wherein, to determine the change in bandwidth, the processing circuitry is configured to determine a device of the plurality of devices is to be paired with the apparatus using the third protocol.

6. The apparatus of claim 3,
wherein the first superframe allocates more bandwidth to the first protocol than the second protocol; and
wherein the second superframe allocates more bandwidth to the second protocol than the first protocol.

7. The apparatus of claim 1,
wherein the initial superframe mode allocates a dynamic slot of the plurality of slots for wireless communication to the first protocol and allocates one or more second protocol slots of the plurality of slots for wireless communication to the second protocol; and
wherein the updated superframe mode allocates the dynamic slot to a third protocol and allocates the one or more second protocol slots to the third protocol.

8. The apparatus of claim 7, wherein, to determine the change in bandwidth, the processing circuitry is configured to determine a device of the plurality of devices is to be paired with the apparatus using the third protocol.

9. The apparatus of claim 7, wherein the second superframe allocates no bandwidth to the second protocol.

10. The apparatus of claim 1, wherein the processing circuitry is further configured to:
output, to the plurality of devices, a first superframe configured for the initial superframe mode,
wherein the initial superframe mode allocates a third protocol slot of the plurality of slots for wireless communication to a third protocol; and
wherein the updated superframe mode allocates the third protocol slot to the first protocol.

11. The apparatus of claim 10, wherein, to determine the change in bandwidth, the processing circuitry is configured to determine a data transmission using the first protocol exceeds a threshold.

12. The apparatus of claim 10,
wherein the first superframe allocates more bandwidth to the third protocol than the first protocol and wherein the first superframe allocates more bandwidth to the third protocol than the second protocol; and
wherein the second superframe allocates less bandwidth to the third protocol than the first protocol and wherein the second superframe allocates less bandwidth to the third protocol than the second protocol.

13. The apparatus of claim 1,
wherein the initial superframe mode allocates a dynamic slot of the plurality of slots for wireless communication to a third protocol; and
wherein the updated superframe mode splits the dynamic slot into a first sub-slot allocated to the first protocol and a second sub-slot allocated to the second protocol.

14. The apparatus of claim 1,
wherein the initial superframe mode allocates a dynamic slot of the plurality of slots for wireless communication to a third protocol; and
wherein the updated superframe mode splits the dynamic slot into a first sub-slot allocated to the third protocol and a second sub-slot allocated to the second protocol.

15. The apparatus of claim 1, wherein the processing circuitry is further configured to:
output, to the plurality of devices, a first superframe configured for the initial superframe mode,
wherein the wireless communication is time divisional multiple access (TDMA) communication;
wherein the first protocol includes a local area networking protocol;
wherein the second protocol includes a low-power wireless connection protocol; and
wherein a third protocol includes a high-bandwidth connection protocol.

16. The apparatus of claim 15,
wherein the first protocol includes WI-FI™;
wherein the second protocol includes IEEE 802.15.4; and
wherein the third protocol includes BLUETOOTH.

17. The apparatus of claim 1, wherein the superframe is configured for a 2.4 GHz band.

18. The apparatus of claim 1, wherein the plurality of devices comprises one or more of a thermostat, a security device, a water heater, a water flow controller, or a garage door controller.

19. A method for wireless communication with a plurality of devices, the method comprising the steps of:
for each respective superframe associated with a superframe mode, dynamically allocating a slot of a plurality of slots of the respective superframe to one of at least a first protocol and a second protocol, wherein the first protocol and the second protocol are different from each other;
selecting an initial superframe mode based on at least one of: (i) a type of device of the plurality of devices, and (ii) an operational mode of communication;
determining a change in bandwidth allocated to the first protocol and/or the second protocol based on a change in the operational mode of communication;
in response to determining the change in bandwidth, selecting, by processing circuitry, an updated superframe mode that is different from the initial superframe mode; and
outputting, by the processing circuitry, to the plurality of devices, a second superframe configured for the updated superframe mode.

20. A system comprising:
a plurality of sensor devices; and
a hub device in wireless communication with the plurality of devices, the hub device comprising processing circuitry configured to:
for each respective superframe associated with a superframe mode, dynamically allocate a slot of a plurality of slots of the respective superframe to one of at least a first protocol and a second protocol, wherein the first protocol and the second protocol are different from each other;
select an initial superframe mode for the wireless communication based on at least one of:
   a type of the plurality of devices using the wireless communication; and
   an operational mode of the wireless communication;
determine a change in bandwidth allocated to the first protocol and/or the second protocol based on a change in the operational mode of the wireless communication;
in response to determining the change in bandwidth, select an updated superframe mode that is different from the initial superframe mode; and
output, to the plurality of devices, a second superframe configured for the updated superframe mode.

\* \* \* \* \*